(12) United States Patent
Solomon et al.

(10) Patent No.: US 10,948,377 B2
(45) Date of Patent: Mar. 16, 2021

(54) METHODS CIRCUITS ASSEMBLIES DEVICES SYSTEMS AND FUNCTIONALLY ASSOCIATED MACHINE EXECUTABLE CODE FOR MECHANICAL FAILURE CLASSIFICATION CONDITION ASSESSMENT AND REMEDIATION RECOMMENDATION

(71) Applicant: Aquarius-Spectrum Ltd., Netanya (IL)

(72) Inventors: David Solomon, Zikhron Ya'akov (IL); Bori Solomon, Zoran (IL)

(73) Assignee: AQUARIUS SPECTRUM LTD., Netanya (IL)

( * ) Notice: Subject to any disclaimer, the term of this patent is extended or adjusted under 35 U.S.C. 154(b) by 297 days.

(21) Appl. No.: 16/163,598

(22) Filed: Oct. 18, 2018

(65) Prior Publication Data
US 2020/0124494 A1 Apr. 23, 2020

(51) Int. Cl.
| | |
|---|---|
| G01M 3/24 | (2006.01) |
| G01M 3/28 | (2006.01) |
| G06F 16/2455 | (2019.01) |
| G06F 16/2457 | (2019.01) |

(52) U.S. Cl.
CPC .......... *G01M 3/243* (2013.01); *G01M 3/2815* (2013.01); *G06F 16/2455* (2019.01); *G06F 16/2457* (2019.01)

(58) Field of Classification Search
CPC . G01M 3/243; G01M 3/2815; G06F 16/2455; G06F 16/2457; G06Q 50/06; E03B 7/003; F17D 5/06
See application file for complete search history.

(56) References Cited

U.S. PATENT DOCUMENTS

| | | | |
|---|---|---|---|
| 5,918,271 A | 6/1999 | McGuigan | |
| 2003/0171879 A1* | 9/2003 | Pittalwala | F17D 5/00 |
| | | | 702/34 |
| 2011/0292384 A1 | 12/2011 | Ramos et al. | |
| 2015/0211673 A1* | 7/2015 | Jan | F16L 9/127 |
| | | | 428/36.9 |
| 2017/0227596 A1* | 8/2017 | Sozer | G01M 5/0058 |
| 2020/0191316 A1* | 6/2020 | Du | G06Q 10/0635 |

FOREIGN PATENT DOCUMENTS

| | | |
|---|---|---|
| DE | 44 15 582 A1 | 11/1995 |
| JP | 5143111 B2 | 2/2013 |
| WO | WO-2014/115039 A2 | 7/2014 |

OTHER PUBLICATIONS

International Search Report and Written Opinion dated Jun. 6, 2018 in PCT/IB19/58882 (14 pages).

\* cited by examiner

*Primary Examiner* — Mischita L Henson
(74) *Attorney, Agent, or Firm* — Foley & Lardner LLP

(57) ABSTRACT

Disclosed, is a system for pipe network failure classification, including a network part sensor layer for monitoring pipe(s) operation condition and collecting related parameter values. A system pipe network parts database includes feature parameter value records of pipes in the pipe network. A classification processing logic, intermittently receive sensor collected parameters from said network part sensor layers, references records of the pipe network parts database and retrieves one or more feature parameter values associated with the failed pipe's operational or environmental conditions, and classifies the pipe failure into one of two or more failure categories.

36 Claims, 12 Drawing Sheets

METHODS CIRCUITS ASSEMBLIES DEVICES SYSTEMS AND FUNCTIONALLY ASSOCIATED MACHINE EXECUTABLE CODE FOR MECHANICAL FAILURE CLASSIFICATION CONDITION ASSESSMENT AND REMEDIATION RECOMMENDATION

RELATED APPLICATIONS SECTION

The present application claims the benefit of applicant's U.S. patent application Ser. No. 12/830,920, now U.S. Pat. No. 8,665,101, filed Jul. 6, 2010 and U.S. patent application Ser. No. 13/982,436, now U.S. Pat. No. 9,846,075, filed Oct. 15, 2013, which are hereby incorporated in their entirety.

FIELD OF THE INVENTION

The present invention generally relates to the field of system monitoring. More specifically, the present invention relates to methods, circuits, assemblies, devices, systems and functionally associated machine executable code for mechanical failure classification, condition assessment and remediation recommendation.

BACKGROUND

The presence of a leak represents a loss of resources as well as an economic loss. In some cases, for example, when the fluid is a toxic or combustible material, the presence of a leak can create a dangerous situation.

Leaks can be detected in two general ways. The first is by detecting the substance that escapes the vessel. The second is by detecting certain leak-related properties such as pressure drops, acoustic emissions, volume balance changes and temperature changes.

There remains a need, in the field of system monitoring, for methods, circuits, assemblies, devices, systems and functionally associated machine executable code, for mechanical failure classification, condition assessment and remediation recommendation, wherein mechanical failures, such as those that may occur in a pipe network, are both detected and classified and wherein the classification may be utilized for the recommendation of remediation to the mechanical failure and for prevention of similar conditions.

SUMMARY OF INVENTION

General

The present invention includes methods, circuits, assemblies, devices, systems and functionally associated machine executable code for mechanical failure detection and classification. Additionally, the present invention includes a system for mechanical condition assessment and for generating failure and maintenance remediation recommendations based at least partially on: (a) operational and environmental condition information of, and surrounding, the part which failed, provided from sensors; (b) databases including records relating to characteristics of the failed part, records of prior events or failures relating to the failed part, records relating to a prior maintenance or remediational tasks performed on failed part and/or records relating to a future maintenance or remediational tasks scheduled to be performed on failed part; and (c) a classification of the detected failure.

According to some embodiments of the present invention, there may be provided a part sensor layer including one or more part sensors and signal processing circuits to receive and process signals generated by the one or more part sensors and indicative of part operation condition and/or failure. There may also be provided a part environment sensor layer including one or more part associated environmental sensors and signal processing circuits to receive and process signals generated by the one or more part environment sensors located on or around a respective. The sensors may, for example, include vibration sensors, acoustic sensors, accelerometers, hydrophones, microphones, pressure sensors, strain sensors, stress sensors, compression sensors, deflection sensors, temperature sensors and/or location sensors.

In some of the following discussions, mechanical failures classification and remediation and operation conditions assessment, are described in the context of a water supply pipe network. This is not the limit the scope of the teachings herein and their applicability for the operation monitoring and support of various mechanical systems, such as but not limited to, fluid supply or disposal systems.

Failure Detection

According to some embodiments, one or more part sensors signals, other part operation monitoring components (e.g. flow meters) and/or database records relating to characteristics of the monitored part(s), may indicate of a part operation failure. Signals measured by part sensors and/or signals from other monitoring/metering components including one or more operation and condition parameter values, may be recorded/logged to a database and intermittently compared, by a Failure Detection Logic, to predefined or dynamically generated operation conditions parameter schemes and/or value combinations—associated with part failure scenarios.

Failure Classification

According to some embodiments, part sensors signals may indicate of part operation, condition and/or failure. One or more operation and condition parameter values, measured by the part sensors layer over time, may be recorded/logged to a database and intermittently compared, by a Failure Classification Logic, to predefined or dynamically generated operation conditions parameter schemes and/or value combinations—associated with corresponding classes of parts and part failure scenarios.

Based on one or more part failure scenarios matched thereto, a given operation failure may be classified into two or more possible failure types or categories, wherein each failure type or category may be associated with a set of one or more potential causes and/or sources thereof.

According to some embodiments, failure associated operation conditions parameter schemes and/or value combinations may include threshold values for: (1) pipe network part related leak intensity and leak intensity change rate, based on vibration/acoustic sensors and/or pipe network flow meters; (2) pipe network part related pressure and pressure transients, based on pressure sensors; (3) database stored, pipe network part features, characteristics and/or specification records; (4) pipe network part environmental conditions, based on part environment sensors; (5) database stored, pipe failure history records; and/or others.

According to some embodiments, failure classification types or categories, associated with operation conditions parameter schemes and/or value combinations, may for example include: (1) part/pipe burst due to material degradation, (2) part/pipe burst due to ground movement, (3) part/pipe burst due to frost or other weather factors, (4) part/pipe corrosion due to stray currents, (5) part/pipe corrosion due to corrosive ground, (6) part/pipe slow/fast developing crack, (7) par/pipe physical breakage/tearing and/or other.

According to some embodiments, potential failure causes and/or sources associated with a failure type or category may include: (1) external physical causes (e.g. humans, vehicles, machinery) (2) external weather and environment related causes (e.g. humidity—corrosion, rusting, electric current heat—melting), (3) internal operational causes (e.g. pipe network pressure, damaged part), (4) maintenance related causes (e.g. old pipes/parts/infrastructure), (5) typical material or part specific causes.

According to some embodiments, part environment sensors signals may indicate of part operation, condition and/or failure, as described above in regard to the part sensor signals. Part environment sensors signals may indicate of one or more environmental conditions on the outside of, in the proximity of and/or in the area(s) around the failed part(s). One or more environmental parameter values, measured by the part environment sensors layer over time, may be recorded/logged to a database and intermittently compared, by the Failure Classification Logic, to predefined or dynamically generated environmental conditions parameter schemes and/or value combinations—associated with corresponding classes of parts and part failure scenarios.

Based on one or more part failure scenarios matched with the measured environmental parameter values, a given operation failure may be classified into two or more possible failure types or categories, wherein each failure type or category may be associated with a set of one or more potential causes and/or sources thereof.

According to some embodiments, sensor measured environmental conditions on the outside of, in the proximity of and/or in the area(s) around the failed part(s), may include: (1) temperature and temperature changes, (2) humidity levels, (3) vibration frequency/amplitude values, (4) pressure levels outside/around part, (5) light amounts, (6) electromagnetic radiation amounts, (7) wind speeds, (8) acidity levels, (9) noise levels and types, (10) ground type, (11) soil acidity levels, (12) electric current and/or other.

Failure Remediation and Condition Assessment

According to some embodiments, one or more remediation solutions, for preventing, terminating, slowing and/or fixing the part failure may be recommended, or automatically executed, based on the classification of a given part(s) operation failure.

According to some embodiments, the classification of the given part(s) operation failure may be used, by a Remediation Retrieval and Recommendation Logic, for referencing a remediation solutions database including remediation solutions records associated with respective part operation failure category cause(s) or source(s). Remediation solutions records in the database, matching the estimated cause(s) or source(s) of the given part(s) operation failure—as defined-by/associated-with the part failure's classification category, may be selected for recommendation and/or execution.

According to some embodiments, remediation solutions may include: alerting of related personal, triggering the operation of management/backup/emergency/repair/shutdown systems, relaying of requests for additional data from the system's part sensors and/or part environment sensors, communicating with 3rd party entities the are the cause/source of the failure or that act to stop it.

According to some embodiments, the classification of part(s) operation failures may be used, by a Condition Assessment Logic, for assessing the operational condition of an entire monitored system or pipe network and the recommendation and prioritization of system/network maintenance/mediation tasks based thereof.

According to some embodiments, classes of part operation failures having high relevancy or urgency for remediation/repair may be defined. In each cluster of a monitored system/pipe-network; the number of actual part operation failures classified to one of the high relevancy or urgency defined classes, may be registered for each of the clusters. Maintenance and repair solutions may then be selected or generated for entire clusters and/or prioritized based on the number of relevant/urgent operation failure in each of the clusters.

BRIEF DESCRIPTION OF THE FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
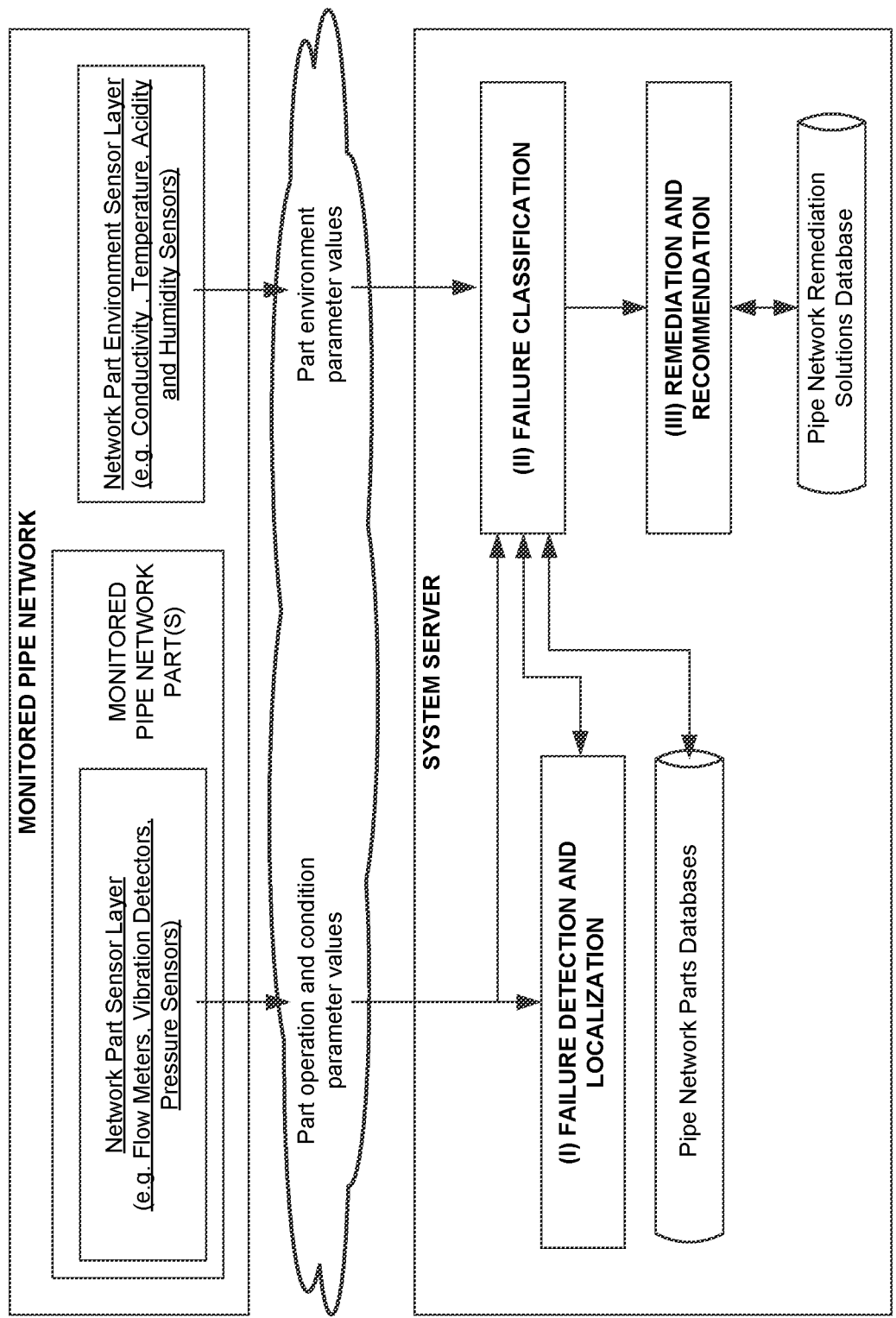
In FIG. 1A, there is shown, in accordance with some embodiments of the present invention, an exemplary system for mechanical failure detection and classification, wherein leaks in a pipe network are detected, classified and provided with a remediation.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, may refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In addition, throughout the specification discussions utilizing terms such as "storing", "hosting", "caching", "saving", or the like, may refer to the action and/or processes of 'writing' and 'keeping' digital information on a computer or computing system, or similar electronic computing device, and may be interchangeably used. The term "plurality" may be used throughout the specification to describe two or more components, devices, elements, parameters and the like.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), any composition and/or architecture of semiconductor based Non-Volatile Memory (NVM), any composition and/or architecture of biologically based Non-Volatile Memory (NVM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other functionally suitable components may be used.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

It is understood that a pipe network, as used herein, may relate to any type of fluid holding and/or carrying system, including tubes, pipes and/or other channels for containing and carrying fluid and possibly including additional components for controlling and facilitating the flow of the fluid through the network, as part of the fluid's acceptance/receipt, storage, propagation and/or disposal/supply.

General

The present invention includes methods, circuits, assemblies, devices, systems and functionally associated machine executable code for mechanical failure detection and classification. Additionally, the present invention includes a system for mechanical condition assessment and for generating failure and maintenance remediation recommendations based at least partially on: (a) operational and environmental condition information of, and surrounding, the part which failed, provided from sensors; (b) databases including records relating to characteristics of the failed part, records of prior events or failures relating to the failed part, records relating to a prior maintenance or remediational tasks performed on failed part and/or records relating to a future maintenance or remediational tasks scheduled to be performed on failed part; and (c) a classification of the detected failure.

According to some embodiments of the present invention, there may be provided a part sensor layer including one or more part sensors and signal processing circuits to receive and process signals generated by the one or more part sensors and indicative of part operation condition and/or failure. There may also be provided a part environment sensor layer including one or more part associated environmental sensors and signal processing circuits to receive and process signals generated by the one or more part environment sensors located on or around a respective. The sensors may, for example, include vibration sensors, acoustic sensors, accelerometers, hydrophones, microphones, pressure sensors, strain sensors, stress sensors, compression sensors, deflection sensors, temperature sensors and/or location sensors.

In some of the following discussions, mechanical failures classification and remediation and operation conditions assessment, are described in the context of a water supply pipe network. This is not the limit the scope of the teachings herein and their applicability for the operation monitoring and support of various mechanical systems, such as but not limited to, fluid supply or disposal systems.

Failure Detection

According to some embodiments, one or more part sensors signals, other part operation monitoring components (e.g. flow meters) and/or database records relating to characteristics of the monitored part(s), may indicate of a part operation failure. Signals measured by part sensors and/or signals from other monitoring/metering components including one or more operation and condition parameter values, may be recorded/logged to a database and intermittently compared, by a Failure Detection Logic, to predefined or dynamically generated operation conditions parameter schemes and/or value combinations—associated with part failure scenarios.

Failure Classification

According to some embodiments, part sensors signals may indicate of part operation, condition and/or failure. One or more operation and condition parameter values, measured by the part sensors layer over time, may be recorded/logged to a database and intermittently compared, by a Failure Classification Logic, to predefined or dynamically generated operation conditions parameter schemes and/or value combinations—associated with corresponding classes of parts and part failure scenarios.

Based on one or more part failure scenarios matched thereto, a given operation failure may be classified into two or more possible failure types or categories, wherein each failure type or category may be associated with a set of one or more potential causes and/or sources thereof.

According to some embodiments, failure associated operation conditions parameter schemes and/or value combinations may include threshold values for: (1) pipe network part related leak intensity and leak intensity change rate, based on vibration/acoustic sensors and/or pipe network flow meters; (2) pipe network part related pressure and pressure transients, based on pressure sensors; (3) database stored, pipe network part features, characteristics and/or specification records; (4) pipe network part environmental conditions, based on part environment sensors; (5) database stored, pipe failure history records; and/or others.

According to some embodiments, failure classification types or categories, associated with operation conditions parameter schemes and/or value combinations, may for example include: (1) part/pipe burst due to material degradation, (2) part/pipe burst due to ground movement, (3) part/pipe burst due to frost or other weather factors, (4) part/pipe corrosion due to stray currents, (5) part/pipe corrosion due to corrosive ground, (6) part/pipe slow/fast developing crack, (7) par/pipe physical breakage/tearing and/or other.

According to some embodiments, potential failure causes and/or sources associated with a failure type or category may include: (1) external physical causes (e.g. humans, vehicles, machinery) (2) external weather and environment related causes (e.g. humidity—corrosion, rusting, electric current heat—melting), (3) internal operational causes (e.g. pipe network pressure, damaged part), (4) maintenance related causes (e.g. old pipes/parts/infrastructure), (5) typical material or part specific causes.

According to some embodiments, part environment sensors signals may indicate of part operation, condition and/or failure, as described above in regard to the part sensor signals. Part environment sensors signals may indicate of one or more environmental conditions on the outside of, in the proximity of and/or in the area(s) around the failed part(s). One or more environmental parameter values, measured by the part environment sensors layer over time, may be recorded/logged to a database and intermittently compared, by the Failure Classification Logic, to predefined or dynamically generated environmental conditions parameter schemes and/or value combinations—associated with corresponding classes of parts and part failure scenarios.

Based on one or more part failure scenarios matched with the measured environmental parameter values, a given operation failure may be classified into two or more possible failure types or categories, wherein each failure type or category may be associated with a set of one or more potential causes and/or sources thereof.

According to some embodiments, sensor measured environmental conditions on the outside of, in the proximity of and/or in the area(s) around the failed part(s), may include: (1) temperature and temperature changes, (2) humidity levels, (3) vibration frequency/amplitude values, (4) pressure levels outside/around part, (5) light amounts, (6) electromagnetic radiation amounts, (7) wind speeds, (8) acidity levels, (9) noise levels and types, (10) ground type, (11) soil acidity levels, (12) electric current and/or other.

Failure Remediation and Condition Assessment

According to some embodiments, one or more remediation solutions, for preventing, terminating, slowing and/or fixing the part failure may be recommended, or automatically executed, based on the classification of a given part(s) operation failure.

According to some embodiments, the classification of the given part(s) operation failure may be used, by a Remediation Retrieval and Recommendation Logic, for referencing a remediation solutions database including remediation solutions records associated with respective part operation failure category cause(s) or source(s). Remediation solutions records in the database, matching the estimated cause(s) or source(s) of the given part(s) operation failure—as defined-by/associated-with the part failure's classification category, may be selected for recommendation and/or execution.

According to some embodiments, remediation solutions may include: alerting of related personal, triggering the operation of management/backup/emergency/repair/shutdown systems, relaying of requests for additional data from the system's part sensors and/or part environment sensors, communicating with 3rd party entities the are the cause/source of the failure or that act to stop it.

According to some embodiments, the classification of part(s) operation failures may be used, by a Condition Assessment Logic, for assessing the operational condition of an entire monitored system or pipe network and the recommendation and prioritization of system/network maintenance/mediation tasks based thereof.

According to some embodiments, classes of part operation failures having high relevancy or urgency for remediation/repair may be defined. In each cluster of a monitored system/pipe-network; the number of actual part operation failures classified to one of the high relevancy or urgency defined classes, may be registered for each of the clusters. Maintenance and repair solutions may then be selected or generated for entire clusters and/or prioritized based on the number of relevant/urgent operation failure in each of the clusters.

In FIG. 1A, there is shown, in accordance with some embodiments of the present invention, an exemplary system for mechanical failure detection and classification, wherein leaks in a pipe network are detected, classified and provided with a remediation.

In the figure, there is shown a monitored pipe network. Pipe network parts, for example, various pipes, sewers, culverts and/or others, are monitored by: (1) a pipe network part sensor layer, including one or more sensors positioned inside and/or on corresponding pipe network parts; and (2) a pipe network part environment sensor layer, including one or more sensors positioned around, in proximity to and/or at the vicinity of corresponding pipe network parts. The part sensor layer and the part environment sensor layer each includes, or is functionally associated with: (1) signal processing circuits for pre-processing and/or digitizing, sensor outputted signals; (2) communication circuitry for communicating processed sensor signals to the system's server(s) and functional blocks thereof; (3) a power source (e.g. a rechargeable battery)—not shown; and (4) a processor for managing and coordinating the operation of the sensors, the signal processing circuits, the electric power consumption, the communication circuitry and/or other system components.

Part operation related parameter values are sensed by the pipe network part sensor layer and relayed to a failure detection and localization block implemented on the system's server(s). The failure detection and localization block analyzes the received sensor readings to indicate/notify/alert upon a sensors' parameter value, or values combination, associated with a pipe network failure such as a leak, occurring.

The shown failure classification block, implemented on the system's server(s), is notified by the failure detection and localization block upon detection of a pipe network failure. Part operation related parameter values sensed by the pipe network part sensor layer and part environment related parameter values sensed by the pipe network part environment sensor layer, are relayed to the failure classification block. The failure classification block analyzes: (1) the part operation related parameter values collected by the failure classification block prior to, during and/or following to, the received failure notification; (2) the part environment related parameter values collected by the failure classification block prior to, during and/or following to, the received failure notification; and/or (3) one or more parameter values, stored in a pipe network parts database, indicative of pipe network parts' characteristics, parts related event and failure history and/or maintenance actions performed on, or to be performed on, parts in the pipe network.

The failure classification block, based on the received notification, based on the received/logged/referenced part and part environment data and/or based on pipe network parts database records, may classify the pipe network part(s) failure which triggered the notification by the system's failure detection and localization block. The classification may be established at least partially based on: (1) the received notification, the place in the pipe network where it occurred and/or the time of day/year in which it occurred; (2) the operational conditions of the failing part(s); (3) the environmental conditions around, in proximity to and/or at the vicinity of the failure; and/or (4) characteristics or maintenance data that may indicate or negate specific parts failures and/or may increase/decrease the likelihood of their occurrence within the specific circumstances.

The remediation and recommendation block, based on the received failure classification, may suggest and/or trigger one or more means or measures to halt, slow down, lower the impact of and/or prevent future occurrence, of the estimated failure. The remediation and recommendation block may reference a pipe network remediation solutions database, querying the database with the part failure's classification data. Respective remediations/solutions, matching the failure class used to query the database, may be triggered by the remediation and recommendation block. Remediation solutions may, for example, take the form of: (1) generating recommendations for parts/infrastructure repair or replacement; (2) alerting or notifying failure to failed-part related personal or systems, optionally with an action recommendation; and/or (3) automatically initiating, terminating and/or changing the operation of one or more failure associated systems.

Figure 1B:
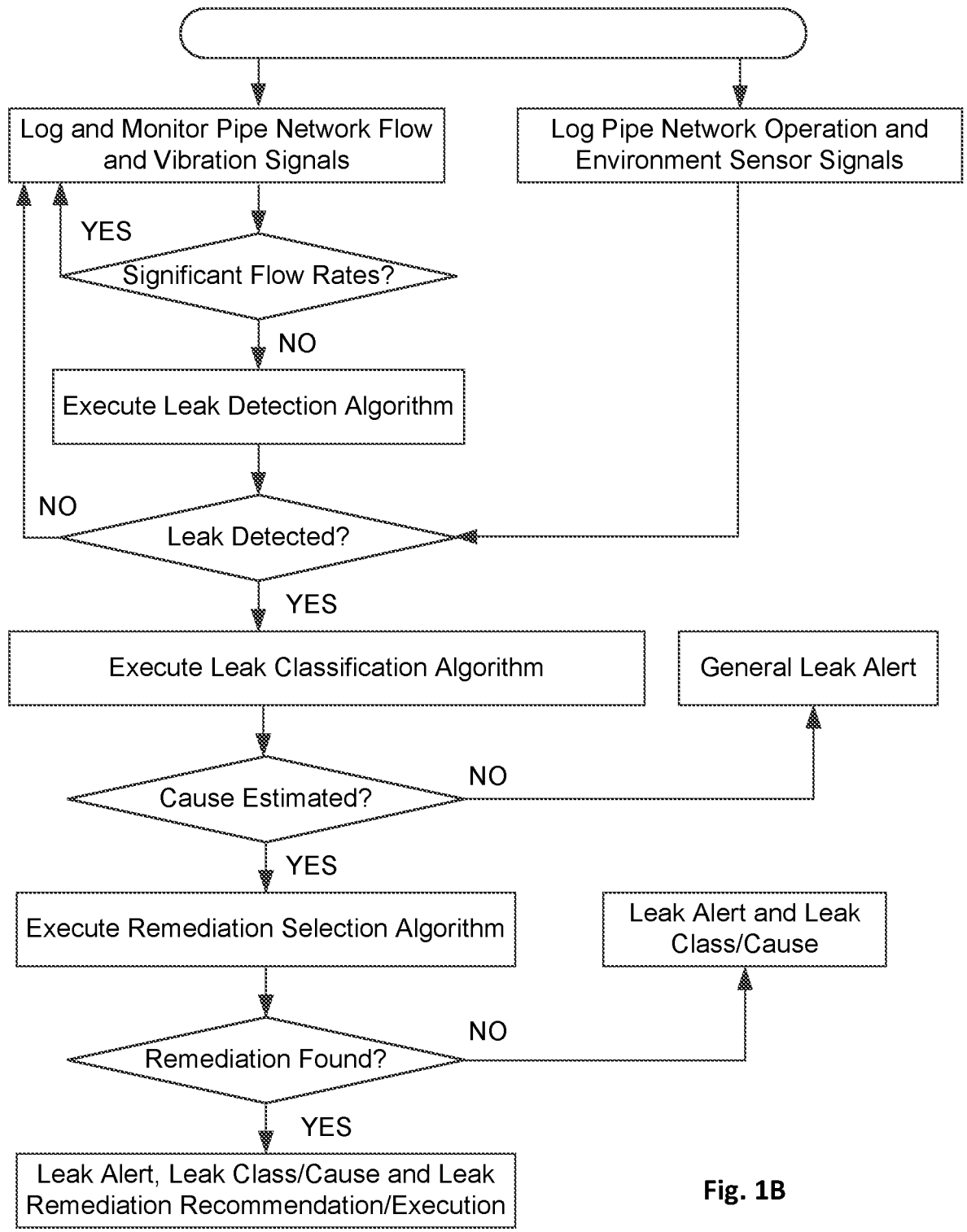
In FIG. 1B, there is shown a flowchart of the main steps executed as part of an exemplary process for mechanical failure detection and classification in a pipe network, in accordance with some embodiments of the present invention.

In FIG. 1B, there is shown a flowchart of the main steps executed as part of a process for mechanical failure (leak) detection and classification in a pipe network, in accordance with some embodiments of the present invention. Shown steps include: (1) Logging and monitoring pipe network flow and vibration signals; (2) Logging and monitoring pipe network operation and environment sensor signals; (3) If significant flow rates in the pipe network remain substantially constant, go back to step 1; else (4) Execute Leak Detection Algorithm; (5) If the algorithm did not detect a leak go back to step 1; else (6) Execute leak classification algorithm; (7) If the algorithm did not classify the failure, issue a general leak alert; else (8) Execute remediation selection algorithm; (9) If the algorithm did not find a remediation to the failure based on the classification, issue a leak alert with the class of the leak; else (10) Issue a leak alert with the estimated class of the leak and a remediation recommendation and/or automatically initiate remediation steps/actions.

Figure 2A:
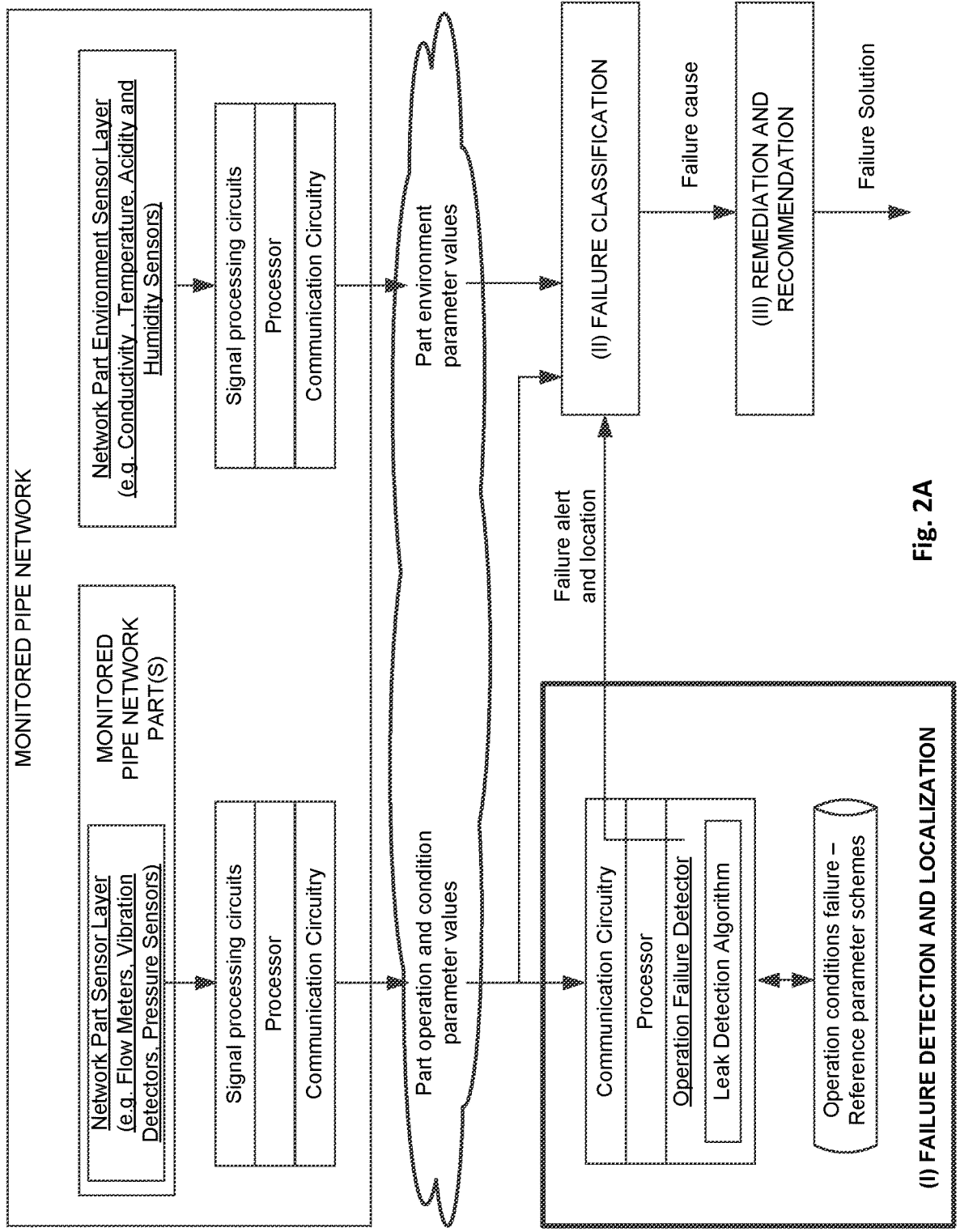
In FIG. 2A, there is shown, in accordance with some embodiments, an exemplary system for mechanical failure detection and classification, wherein the system's failure detection and localization block is shown in further detail.

In FIG. 2A, there is shown, in accordance with some embodiments, an exemplary system for mechanical failure detection and classification, wherein the system's failure detection and localization block is shown in further detail. The failure detection and localization block is shown to include: (1) communication circuitry for intermittently receiving parameter values measured by the sensors of the network part sensor layer and/or relaying corresponding receipt acknowledgments; (2) an operation failure detector (also referred to herein, as failure detection logic) for analyzing the parameter values received from the part sensors and determining whether they indicate a possible pipe network part(s) failure; and (3) a processor for managing the operation of the communication circuitry, the failure detector and/or other system components.

The operation failure detector may execute a leak detection algorithm for determining a part failure, by referencing the 'operation conditions failure—reference parameters schemes' database, while comparing one or more sensor parameter values received over time, to one or more values or value patterns stored in the database. Database stored values or value patterns, for example the fluid flow rates and the vibration levels/frequencies of a specific sensor monitored part(s) of the pipe network, may correspond to specific part failures, or to general failure type estimations, associated therewith.

Figure 2B:
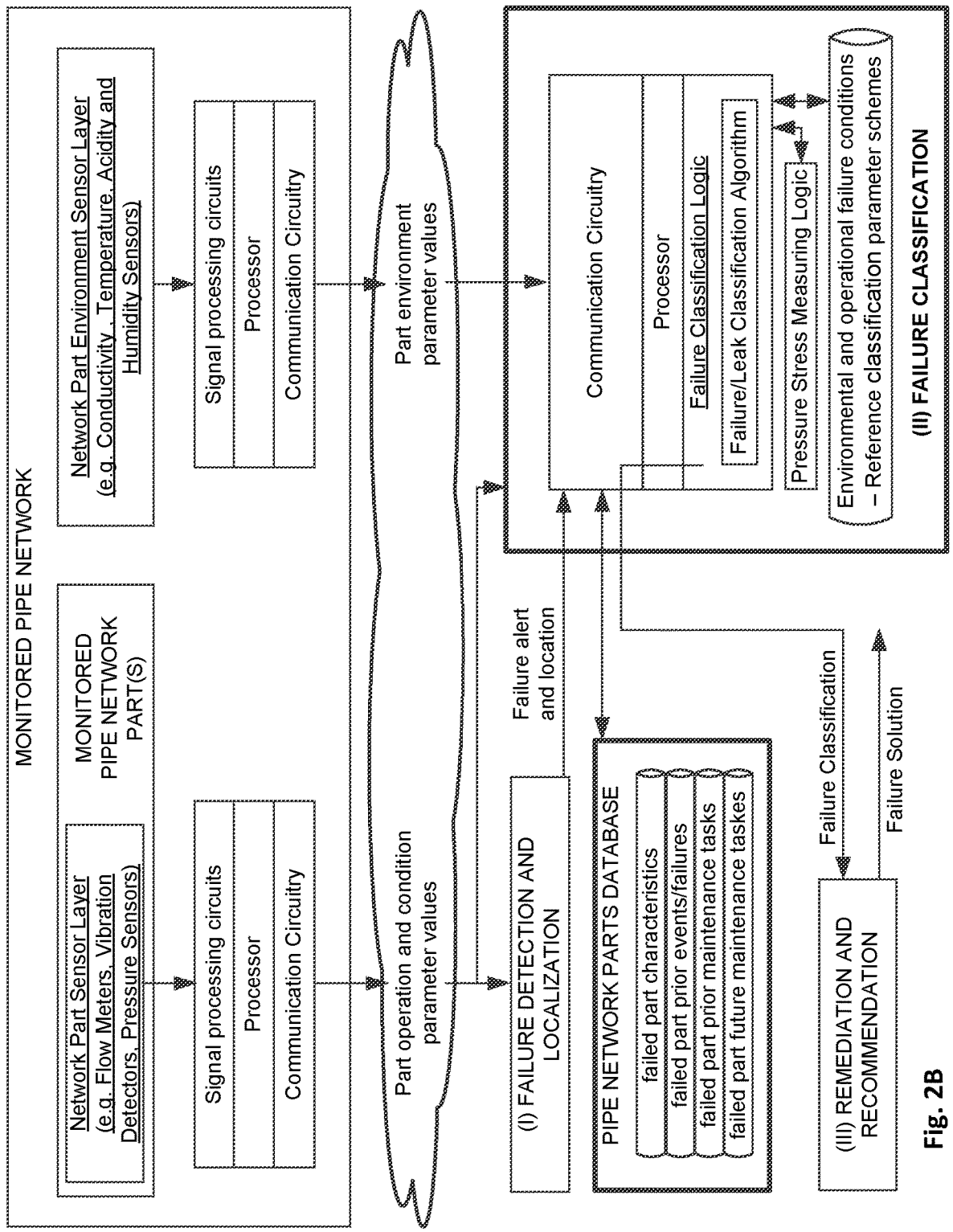
In FIG. 2B, there is shown, in accordance with some embodiments, an exemplary system for mechanical failure detection and classification, wherein the system's failure classification block is shown in further detail.

In FIG. 2B, there is shown, in accordance with some embodiments, an exemplary system for mechanical failure detection and classification, wherein the system's failure classification block is shown in further detail. The failure classification block is shown to include: (1) communication circuitry, for intermittently receiving part failure notifications from the failure detection and localization block, for intermittently receiving parameter values measured by the sensors of the network part sensor layer and network part environment sensor layer, for relaying corresponding receipt acknowledgments, for referencing a pipe network parts database and/or for relaying data indicative of the classification/cause of a system part failure; (2) a failure classification logic for analyzing the parameter values received from the part operation and environment sensors and classifying the pipe network part failure detected by the system's failure detection and localization block; and (3) a processor for managing the operation of the communication circuitry, the failure cause estimator and/or other system components.

The failure classification logic may execute a failure classification algorithm for determining a part failure's class, by referencing the 'environmental and operational failure conditions—reference classification parameter schemes' database, while comparing one or more part(s) operation and/or environment sensor parameter values received over time, to one or more values or value patterns stored in the database. Database stored values or value patterns, may correspond to specific part failure classes for classified failures to be associated therewith.

The failure classification logic and failure classification algorithm thereof, may further reference the 'pipe network parts database' shown, storing various characteristics, maintenance and/or event/failure history of the pipe network's part(s). Part(s)' characteristics, maintenance data and/or failure history, may be utilized by the classification algorithm to further confirm, dismiss and/or otherwise affect its part failure classification decisions.

For example, a recent maintenance check performed on a given part, may lower the chance of wear based failure of the part, thus increasing the chance of the failure being classified as caused by factors external to the system; environmental sensors measured conditions, indicating a slow gradual increase in the level of humidity around a given pipe network part may, for example, be associated with a slowly corroding/rusting pipe section, if however, the pipe network parts database indicates that this pipe section is made of a polymer, the option of a rusting pipe may be negated.

Figure 2C:
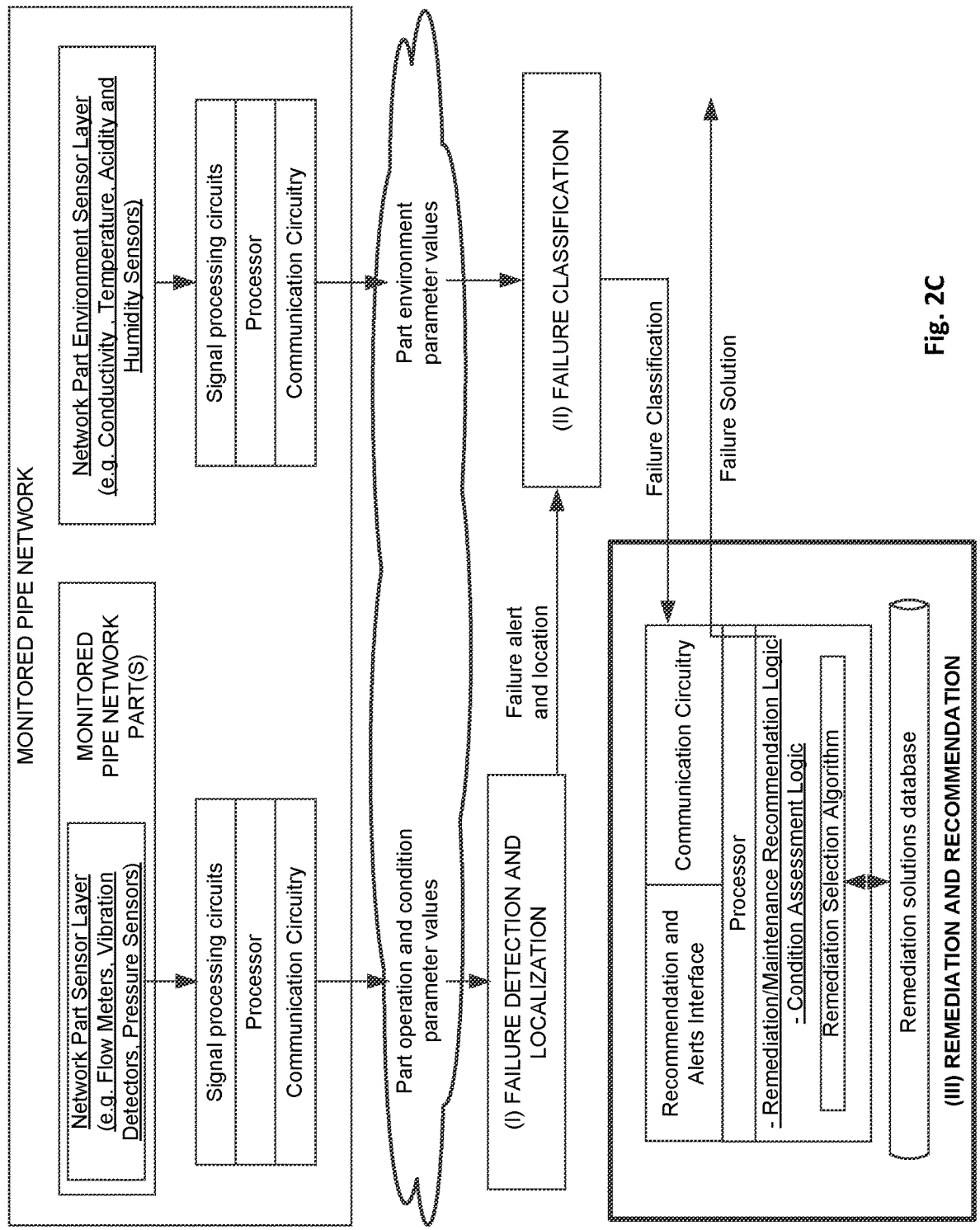
In FIG. 2C, there is shown, in accordance with some embodiments, an exemplary system for mechanical failure detection and classification, wherein the system's remediation and recommendation block is shown in further detail.

In FIG. 2C, there is shown, in accordance with some embodiments, an exemplary system for mechanical failure detection and classification, wherein the system's remediation and recommendation block is shown in further detail. The remediation and recommendation block is shown to include: (1) communication circuitry, for intermittently receiving part failure classifications, for relaying data offering part failure solutions for system detected pipe network failures and conditions, for which a classification or assessment has been made and/or for relaying remediation related operation commands/requests to one or more systems which are part of the pipe network or are functionally associated with its operation; (2) a remediation/maintenance recommendation logic for retrieving solution(s) matching specific pipe network part failures and conditions, as classified by the failure classification logic or as assessed by the shown pipe condition assessment logic; and (3) a processor for managing the operation of the communication circuitry, the remediation/maintenance recommendation logic and/or other system components.

The remediation/maintenance recommendation logic may execute a remediation selection algorithm for referencing the remediation solutions database shown, querying the database with the failure classification or the network condition assessment and/or with additional data relating to the type of failure detected and/or pipe network part(s) associated therewith. Remediations/solutions, matching the estimated failure class used to query the database, are triggered by the remediation and recommendation block. Remediation solutions may take the form of: (1) generating recommendations for parts/infrastructure repair or replacement; (2) alerting or notifying failure or failed-part related personal or systems, optionally with an action recommendation; and/or (3) automatically initiating, terminating and/or changing the operation of one or more failure associated systems.

Alerting or notifying failure or failed-part related personal or systems, optionally with an action recommendation, may for example include the sending of a digital—visual (e.g. picture, video), acoustic/vocal (e.g. alert sound, voice instructions) or text message (e.g. written instructions) to the pipe's network manager/administrator or to a manager/administrator of a system functionally associated therewith (e.g. municipal water supply, sewage, drainage systems). The message may include instructions for solving or minimizing the effect of the pipe network part(s) failure, wherein the instructions may comprise commands/requests for changes in the pipe network's operation—for example, instructions to slow or halt the feeding of fluid into the pipe network, instructions to replace or repair specific part(s), instructions to close/seal specific pipe network sections and/or specific pipe network valves, taps, stopcocks and/or faucets.

Automatically initiating, terminating and/or changing the operation of one or more failure associated systems, may for example include: the automatic slowing or halting the feeding of fluid into the pipe network, the automatic triggering of replacement or repairing operations, automatic alteration, rerouting or rechanneling of the fluid flow in the pipe network, automatic closing/sealing of specific pipe network sections and/or specific pipe network valves, taps, stopcocks and/or faucets.

Pipe Network Features and Factors Collection for Failure Classification and Condition Assessment Purposes—Sensor Collected and Stored Data According to some embodiments of the present invention, system sensors may continuously monitor a pipe network, intermittently providing measurements. Sensor measurements may, for example, be provided on a periodic (e.g. daily) basis, wherein: vibrations measured by sensors for a time period (e.g. for a few seconds), water meters readings and/or pressure sensors readings are communicated once, or several times, a time period (e.g. a day).

According to some embodiments, the estimated intensity of a leak in a pipe network, may be used for pipe network failure detection, classification and/or pipe condition assessment. The estimated intensity may be calculated based on readings from one or more acoustic/vibration sensors (the terms: acoustic, vibration and/or acoustic/vibration sensors, as utilized herein, may include any combination of accelerometer(s) and/or hydrophone(s)) and/or one or more water meters—monitoring the pipe network.

According to some embodiments, leak intensity may be estimated from, or calculated based on, vibration intensity as measured by acoustic/vibration sensor(s) installed in proximity to the leak; and/or by utilizing a cross correlation function of the vibration signal. The following is an exemplary formula for cross correlation of sensor measured vibration signals to a pipe leak intensity level, in accordance with some embodiments of the present invention.

According to some embodiments, a leak calculation model may, for example, estimate the intensity of a leak based on acoustic correlation measurements. The model, in accordance with some embodiments, may calculate leak intensity at least partially factoring field validated coefficients calculated based on multiple monitored real life leak cases and/or leak experiments, analyzed/conducted over a time period.

Leak intensity estimation, in accordance with some embodiments, may be applied for: (1) Leak size/intensity based repair prioritization; (2) Leak overtime growth based pipe condition assessment; (3) Leak related fluid loss levels/amounts estimation; and/or others.

According to some embodiments, the leak calculation model—assuming two or more sensors over a leaking pipe section—measures the acoustic energy at the location of each sensor.

Figure 3A:
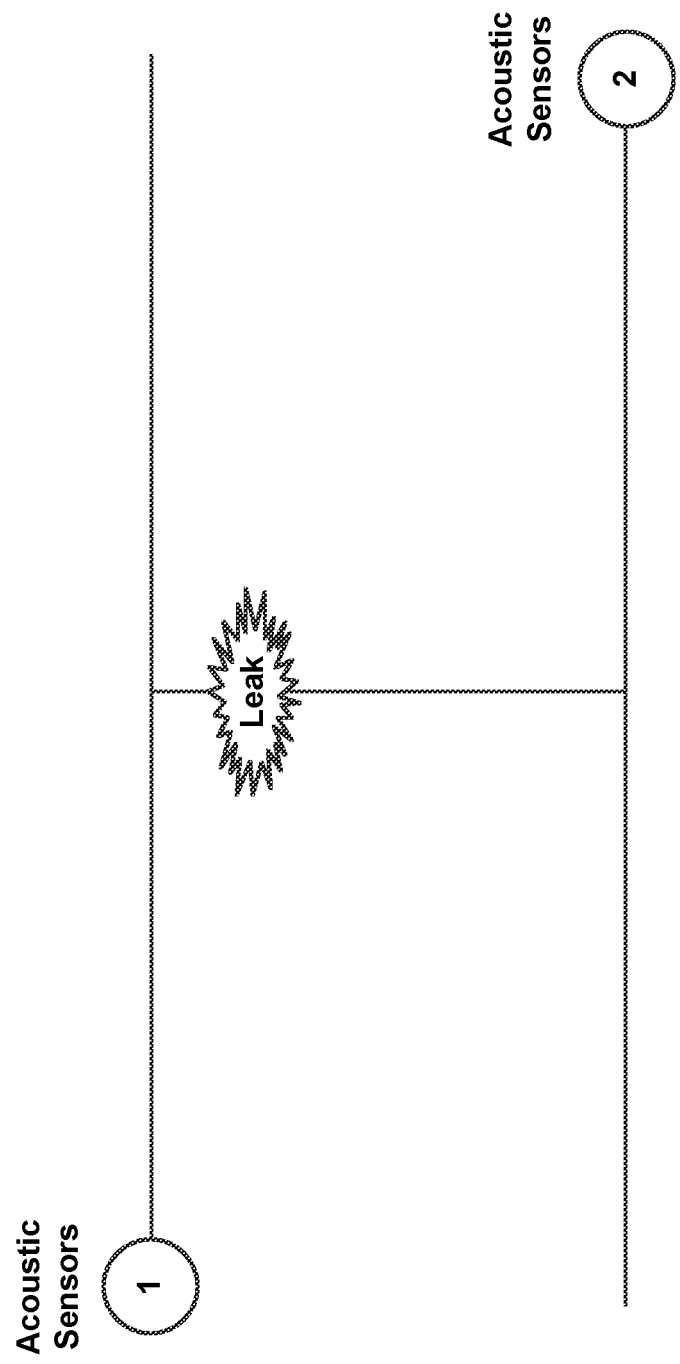
In FIG. 3A there is shown, in accordance with some embodiments, a schematic view of an exemplary leaking pipe section over which two acoustic system sensors/sensor-units are positioned.

In FIG. 3A there is shown a schematic view of an exemplary leaking pipe section over which two acoustic system sensors are positioned. Acoustic energy levels data collected by the sensors is used to perform a correlation to matching flow intensity related characteristics and/or values.

According to some embodiments, the distance between the two sensors shown in the figure may, for example, be anywhere between 200 and 600 meters and may depend on pipe topology, pipe material and/or other pipe network, or pipe network pipes, characteristics.

The leak shown, is characterized by: (i) its flow [F]; and (ii) its differential pressure [P]—the difference between the water pressure in the pipe and the pressure outside it. The Power (watts) that is released by the leak jet may accordingly be calculated by the following formula:

$$\text{Jet Power}[N*m/s]=\text{Flow}[m^3/s]*\text{Pressure}[N/m^2].$$

According to some embodiments, a fraction of the calculated Jet-Power is converted to the acoustic-power that travels over the pipes to the sensors. A conversion ratio K1 may depend on numerous factors—such as the shape of the leak—that influence the jet velocity.

The acoustic vibrations from the leak propagates to the sensors along the pipes and may be represented by a characteristic attenuation coefficient K2. In order to estimate the acoustic-power at the leak, a pipe attenuation model is implemented. The model assumes attenuation coefficient over the pipe according to the pipe material and/or additional pipe characteristics. The calibrating of the model by measuring attenuation coefficient for the relevant pipes may improve its accuracy and may be applicable/scalable to large installation projects.

Acoustic Power may be calculated by a function factoring both the sensors signal correlation and the signal attenuation in the pipes:

$$\text{AcousticPower}=F(\text{CorrelationIntensity},\text{Attenuation}).$$

The calculated AcousticPower and the Pressure, may be factored as part of the leak flow calculation:

$$\text{LeakFlow}=\text{AcousticPower}/(\text{ConversionFactor}*\text{Pressure}).$$

Figure 3B:
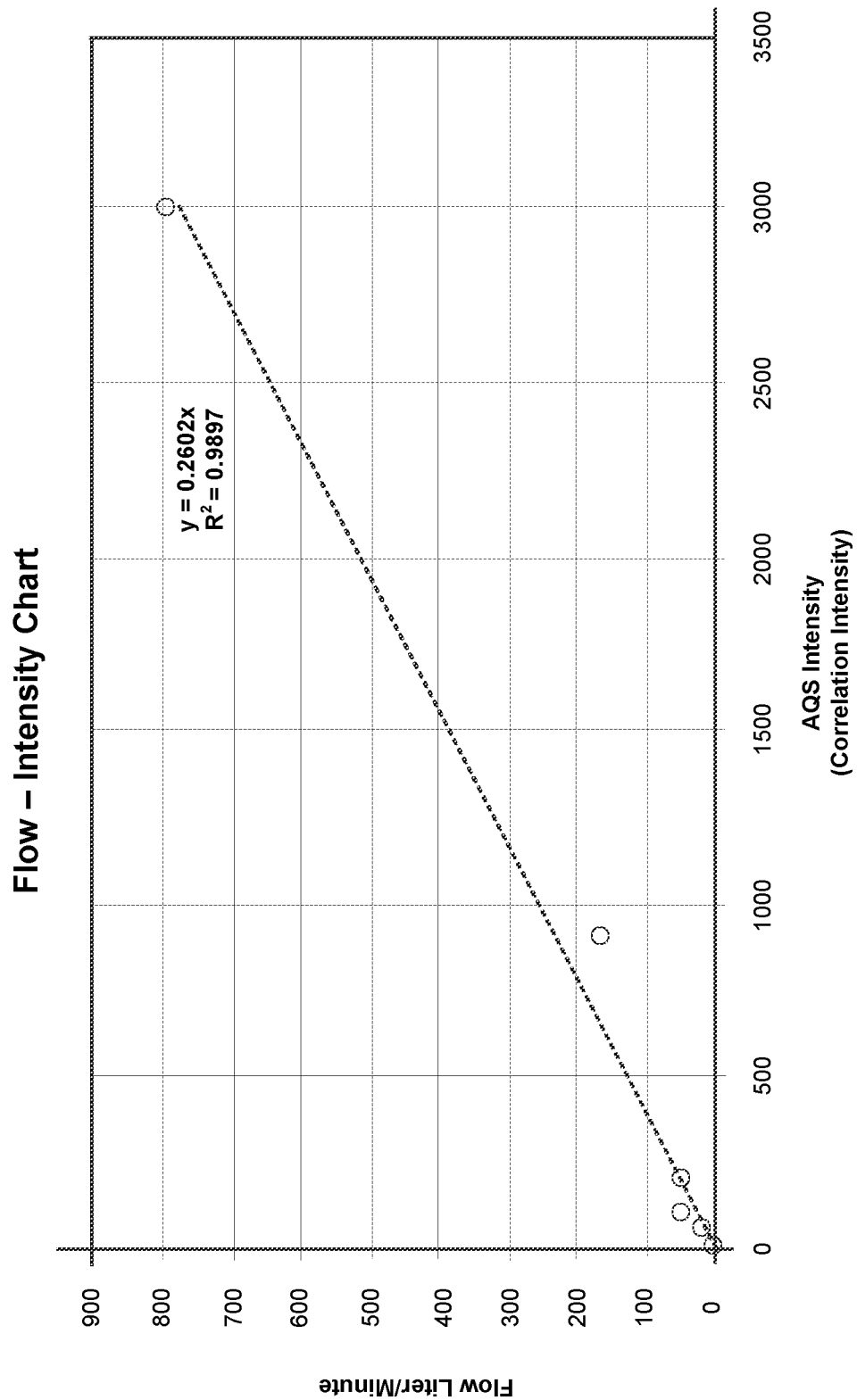
In FIG. 3B, there is shown, in accordance with some embodiments, an exemplary empiric relationship graph between the calculated Leak Flow and Correlation Intensity.

In FIG. 3B, there is shown an exemplary empiric relationship graph between the calculated Leak Flow and Correlation Intensity. The exemplary empiric relationship is based on measured leaks and hydrant openings at a pressure of ~4 Bars. The graph shows the relationship between the calculated Correlation Intensity and Leak Flow, at a given pressure, to be substantially linear.

The cross correlation function, or another technique of pattern matching utilized, may enable the detection of a leak and the calculation of the location of the leak, for example, based on the time shift between the received sensor signals and may be further utilized to estimate the acoustic energy at the source (i.e. at the location of the leak).

According to some embodiments, factors such as pipe attenuation, pressure and/or any other database stored or sensor measured factors, may be used for: regulation, normalization, tuning and/or error correction of calculated leak intensity values.

According to some embodiments, the relative change in the intensity of a leak, in a pipe network, may be used for pipe network failure classification and/or pipe condition assessment. According to some embodiments, the relative change in the intensity of a leak, optionally without additional knowledge of the absolute values of the leak's intensity, may be indicative of the leak. A change/jump in the intensity of a leak, the size of the change in relation to prior changes and/or the size of change per time unit, may provide understanding of the process of failure which caused the leak, characterize it, classify the failure based thereof and/or assess the condition of pipe network parts/sections at the location of the leak and/or at other pipe network locations.

According to some embodiments, flow meters in a pipe network, for example a district metering area (DMA), may be utilized by the system to estimate leak intensity. The velocity, or rate of change, of the flow may be factored as part of a leak's failure classification. For example, a sudden increase in the night flow may provide indication of a burst in a network pipe, whereas a slowly growing night flow may provide indication of gradually developing leaks in the pipe network.

Figure 4:
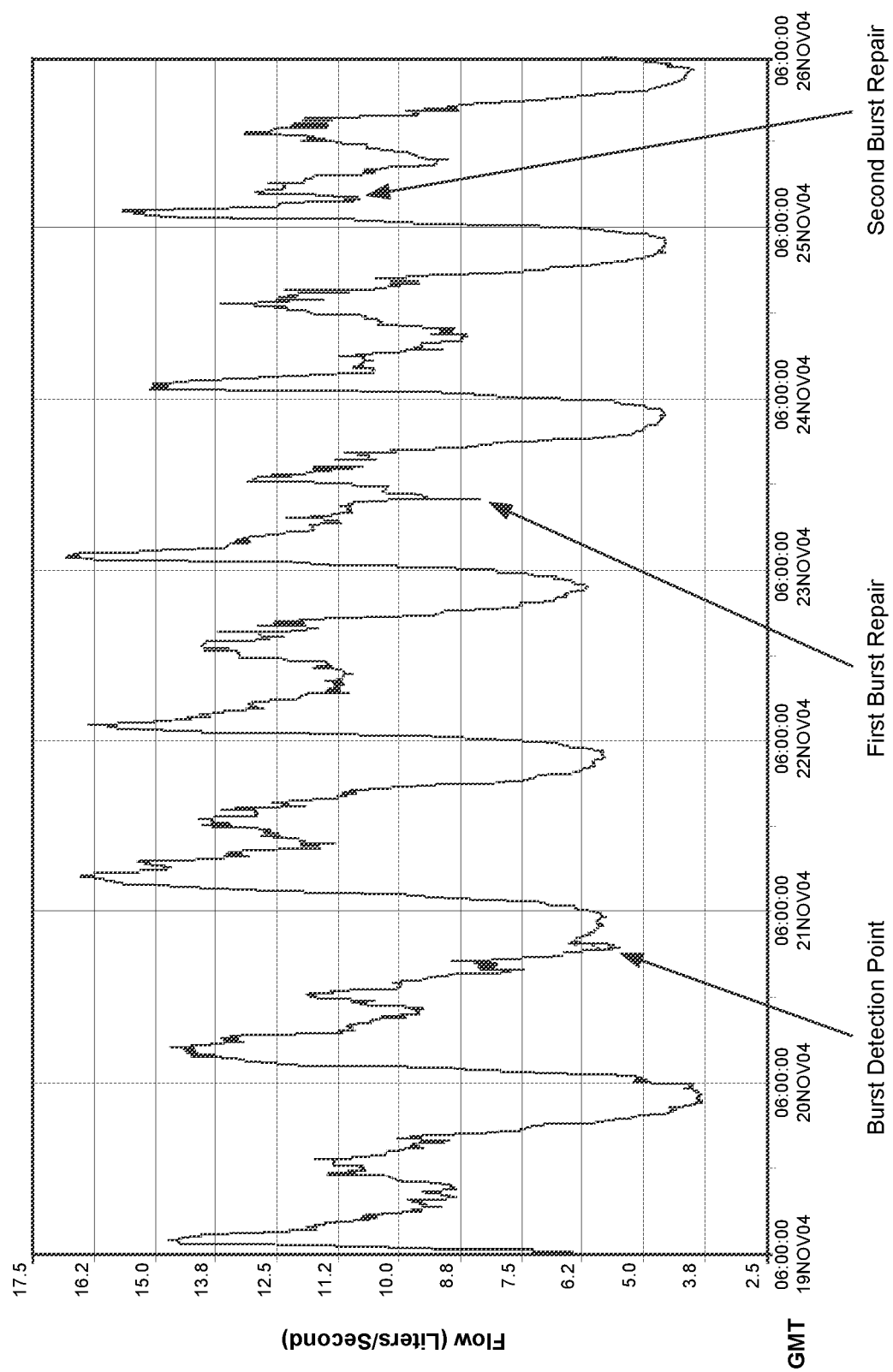
In FIG. 4, there is shown, in accordance with some embodiments, an exemplary reading of a pipe network water meter flow intensity measured values, over a time period of a week.

In FIG. 4, there is shown, an exemplary reading of water meter measured values over a time period of a week. Abrupt changes in the flow intensity values measured by the water meter, as the 'burst detected' shown in the figure, may be indicative of a failure/leak and may be identifiable, by a system in accordance with some embodiments of the present invention, based on a combination of: the size/delta (amplitude) of the change, the rate/speed (steepness) of change, the time length (frequency) of the change, the time of day/week/month/year when the change occurred and/or the flow characteristics as measured prior to and after the detected change.

Further shown in the figure, is the abrupt change in water flow intensity, indicative of and identified by the system as a repair of the failure/leak associated with the previously detected burst.

According to some embodiments, leak intensity change, or change rate, may be used as a feature for pipe network failure classification and condition assessment. Either with, or without, knowledge of the exact/absolute intensity of a given leak, the change in the intensity may be factored to learn about the failure's mechanism. For example, a slow change in the intensity may indicate a slowly developing corrosion, possibly in its early stages; whereas a fast growth in intensity may indicate a corrosion in an already deteriorated metal pipe or a fast growing crack in a Polyvinyl Chloride (PVC) or an Asbestos-Cement (AC) pipe.

According to some embodiments, leak intensity levels and/or leak intensity change rates may be used as parameters, as part of a pipe network's—failure classification, condition assessment and/or failure/condition remediation/maintenance recommendation. Leak intensity levels and/or leak intensity change rates may be at least partially calculated/measured/estimated by cross-correlation of sensor measured vibration/acoustic signals to corresponding pipe leak intensity levels or level changes.

According to some embodiments, the pressure within a pipe network and the change in pressure over time, may be used for pipe network failure classification and/or pipe condition assessment. The pressure may be calculated based on readings from one or more pressure sensors, optionally positioned at multiple locations of the pipe network.

According to some embodiments, pressure levels within a pipe network and the changes in pressure over time may be used as parameters, as part of a pipe network's—failure prediction and classification, condition assessment and/or failure/condition remediation/maintenance recommendation.

A system in accordance with some embodiments, may include a pressure variation based stress measuring logic for estimating the stress on a network pipe that is induced by pressure changes. The calculated induced stress may factor a combination of: the rate of pressure changes over time, the amplitude or size of the changes, whether pressure transients have high values of both positive and negative pressure and/or the diameter of the pipe in which pressure is being measured (the larger the pipe diameter is, the more sensitive it is for pressure transients and the prevalence of pressure transients is higher).

For example, if the typical pressure in a pipe is 4 bar—a pressure transient of 20 bars for over 100 ms may indicate a stress level that can tear the pipe or cause it to burst—and may accordingly trigger a respective alert, prediction and/or remediation. Alternatively, smaller oscillations of the pressure (in the same pipe) with an amplitude of only 3 bar may cause a pipe failure as well, if they appear more frequently—and may likewise trigger a respective alert, prediction and/or remediation.

The following is an exemplary formula for calculating the estimated stress on a pipe network pipe/part/section/location based on pressure sensors readings, in accordance with some embodiments of the present invention. The estimated stress, in accordance with some embodiments, may be proportional to the pressure level measured and to the diameter of the pipe; and inversely proportional to the pipe-wall thickness. For example, by the formula:

$$Stress = (P*D)/(2*T);$$

wherein: P=Pressure, D=Pipe Diameter and T=Pipe Wall Thickness.

Pressure changes and/or pressure change patterns, causing stress (fatigue) above predefined or dynamically defined thresholds/limits may lead to pipe network failure. A system in accordance with some embodiments, may include one or more pressure sensors that are able to measure a range of pressure levels and pressure variations, from slow pressure variations that are caused by changes in pumping and consumption and up to fast pressure transients that result from pressure waves and can be intense.

A system, in accordance with some embodiments, may include, as part of the pressure variation based stress measuring logic or functionally associated thereto, a pressure stress (fatigue) factor calculation logic for calculating fatigue stress in network pipes based on readings from the pressure sensors monitoring the pressure in the pipe network. According to some embodiments, the cycles of pressure in the pipes may be measured and then translated to the stress cycles' amplitude and cycles/frequency. According to some embodiments, as part of fatigue stress calculation, negative pressure—creating radial/shear stress on pipe walls due to asymmetric loading and ground pressure—may be given a higher stress factor/weight than similarly sized positive pressure—creating circumferential stress in the pipe which is considered less harmful (smaller failure potential) to a pipe.

According to some embodiments, the calculation of pressure transients caused pipe stress levels, may include a combination of the following steps: (1) measuring/calculating the amplitudes and number of cycles of pressure changes over a given time period; (2) translating pressure amplitudes to a stress levels in/on the pipe wall; (3) given the stress levels and the number of cycles over the given time period, calculating the fatigue factor/probability for failure, for example, using an S-N curve fatigue model.

Figure 5:
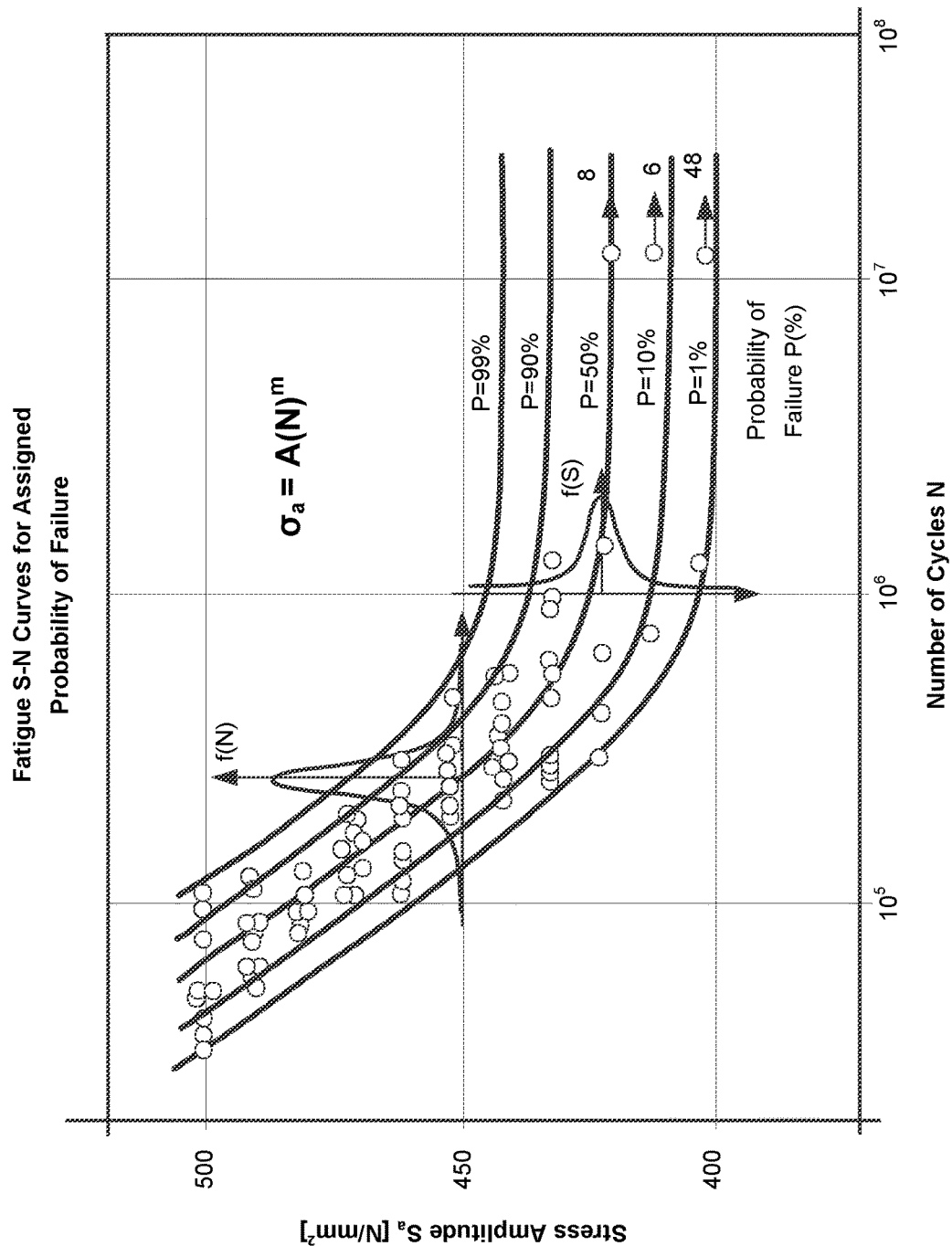
In FIG. 5, there is shown, in accordance with some embodiments, an exemplary S-N curve fatigue model applicable to pipe network part/pipe fatigue calculation based on pressure transients caused pipe stress.

In FIG. 5, there is shown, in accordance with some embodiments, an exemplary S-N curve fatigue model applicable to pipe network part/pipe fatigue calculation based on pressure transients caused pipe stress, wherein individual pipe stress levels experienced (S) are based on the measured intensity of corresponding transients; and the number of experienced stresses (N) corresponds to the measured number of separate/different transients/shocks/waves.

A system in accordance with some embodiments, may include, or have access to, a pipe network parts database, Network pipe features and characteristics data may be referenced and considered/factored as part of pipe network failure detection, failure classification, network condition assessment and/or failure/condition remediation/maintenance recommendation.

Exemplary features of a pipe may include: (1) Pipe Material: (a) Metal: Cast iron, Ductile iron, Steel, Steel with cement coating, (b) Plastic: PVC/UPVC, HDPE/MDPE, (c) AC, (d) Concrete; (2) Pipe Diameter; (3) Depth of Pipe Installation; (4) Pipe Age; (5) Specific information of pipe or installation (e.g. weakness in joints, sensitivity to corrosion); and/or other.

According to some embodiments, the environmental conditions at the proximity/surroundings of a pipe network and their changing over time, may be used for pipe network failure classification and/or pipe condition assessment. The environmental condition parameters may be used as part of the system's decision processes, for example as supportive information to strengthen/reaffirm, or weaken/contradict, classification and recommendation decisions based on other measured/stored data and features.

A system in accordance with some embodiments, may include one or more environmental sensors, optionally positioned at multiple locations in the proximity/surroundings of the pipe network. Environmental sensors readings may be considered/factored as part of pipe network failure detection, failure classification, network condition assessment and/or failure/condition remediation/maintenance recommendation.

Exemplary environmental parameters of a pipe network's proximity/surroundings, to be considered as part of the system's failure analysis decisions may include a combination of: (1) Temperature and temperature change (e.g. from frost to warm, warm to frost); (2) Soil acidity; (3) Ground movements and vibration (e.g. due to traffic, constructions works); (4) Stray currents in the ground from electrical grounding; (5) Ground type (e.g. sand/clay or rocky—rocky ground causes cracks in plastic pipes); and or others.

A system in accordance with some embodiments, may include, or have access to, a pipe network parts database. Network pipe parts' history of failures data may be referenced and considered/factored as part of pipe network failure classification, network condition assessment and/or failure/condition remediation/maintenance recommendation.

Exemplary failure history data may include a database of prior leaks' parameters records, such as, but not limited to: (1) Location of leak on a pipe network; (2) Leaking pipe section details; (3) Growth rate of leak over time; (4) Leak size at the time of repair; (5) Leak type (e.g. crack, hole, corrosion); and/or (6) other leak related data.

Pipe Failure Classification and Pipe Condition Assessment Based on Collected Features and Factors A system in accordance with some embodiments, may include: a failure classification logic, a pipe condition assessment logic and/or a remediation/maintenance recommendation logic. The classification, assessment and recommendation logics may execute respective algorithm(s), wherein any combination of pipe network features and factors based on sensor collected data and pipe network pre-collected/stored data—as described and exemplified herein—may be used as factors, parameters and/or input values for the execution of the algorithms, potentially affecting the resulting algorithm outcomes/outputs, and failure classification, assessment and/or recommendation decisions that are based on the algorithms' outcomes/outputs).

Failure Classification

A pipe network failure/leak classification process, in accordance with some embodiments, may be utilized to identify specific failure cases, such as cases of systematic failure, which can be characterized by operational and environmental factors and features. The identification and/or prediction of such and other failure cases, may facilitate/improve/optimize the decision making ability of pipe network (e.g. water supply network) utilities/systems/personal—in regard to: (1) the recommended failure repair/remediation/maintenance; and/or (2) the predicted failures and failure rates for combinations of specific part/pipe classes/features, specific operational conditions and/or specific environmental conditions.

The following is an exemplary method/technique, for implementation by a system algorithm(s), for the automatic classification of failures and for 'failure classes' based repair-recommendation and failure-prediction.

The method/technique, in accordance with some embodiments, may provide recommendations and/or predictions to some or all of the failure classes/classifications it receives as input. For example, only recommendations/predictions reached with a certainty/confidence level over a given threshold value may be provided as output by the algorithm; wherein recommendations/predictions failing to reach/pass the required certainty/confidence level threshold, or recommendations/predictions which are based on failure classifications failing to reach/pass a required classification certainty/confidence level threshold, are not made/outputted/executed/communicated and/or filtered out of consideration.

According to some embodiments, a decision tree algorithm implementation may use pipe network features input parameters/values, and a set of predefined/dynamically-defined thresholds; to make failure classification decisions and, to generate/select recommendations for their repair based thereof.

An exemplary system operation scenario, including a classification method/technique implementing a decision tree algorithm, may include: (1) Monitoring a pipe network for failure. For example, based on a combination of vibration/acoustic sensors and flow meters readings/data; (2) Monitoring the pipe network for vibration/acoustic signals, pressure and pressure transients and/or environmental parameters; (3) Upon detection of a pipe network failure (detection optionally including the failure's locating within the pipe network) referencing/retrieving: (a) monitored vibration/acoustic data, pressure related data and/or environmental data, associated with the failed network pipe/part; and/or (b) physical parameters/specifications data and/or failure history data, of the failed network pipe/part and/or pipes/parts operationally related thereto; and/or (4) Executing the decision tree classification algorithm, using: (a) at least some of the referenced/retrieved data types as input parameters/values for the decision tree algorithm's execution; and (b) decision thresholds that may be calculated: theoretically, empirically, statistically and/or fitted by machine learning using examples (e.g. examples, otherwise determined as successful) as a training set(s).

Figure 6A:
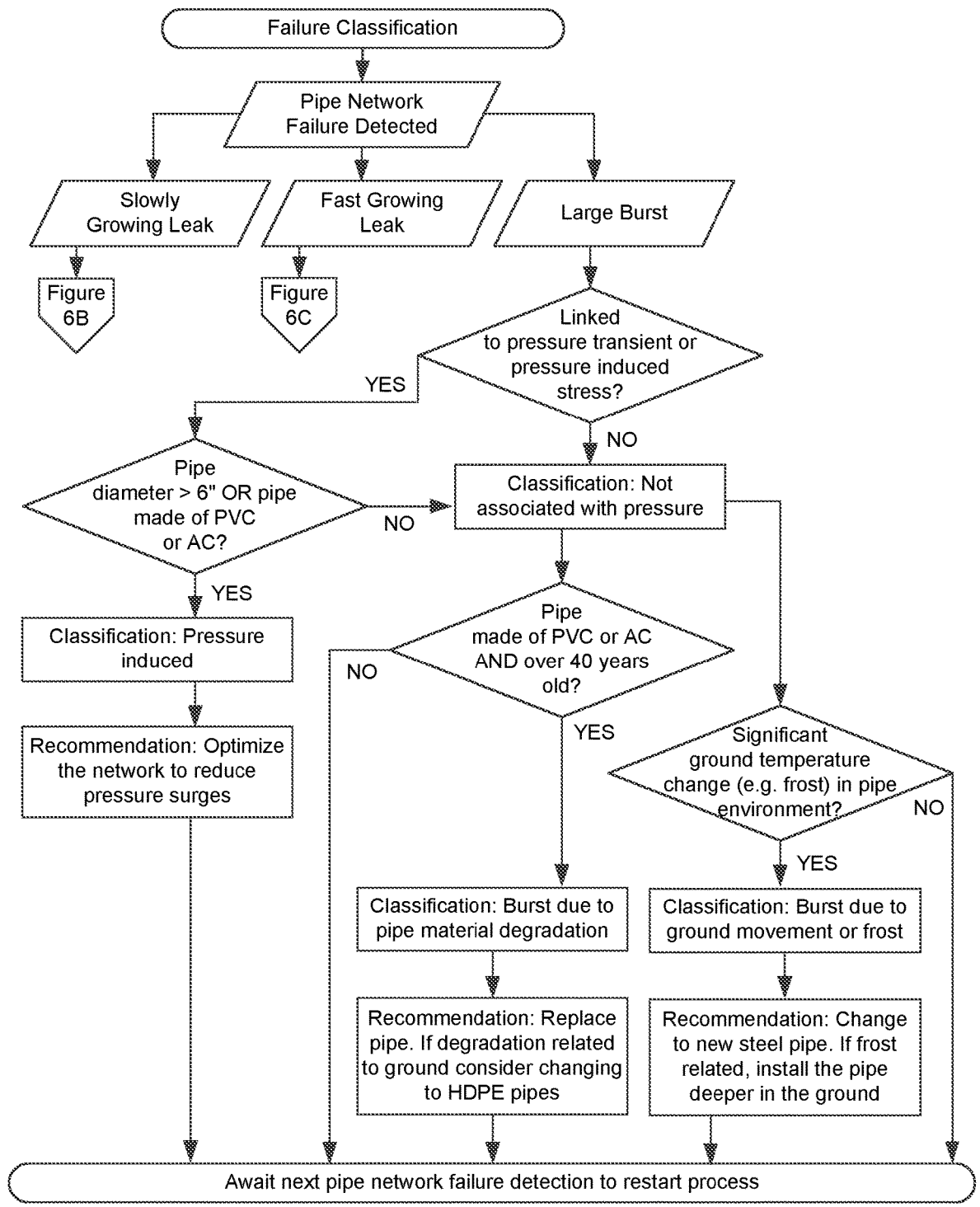
In FIG. 6A, there is shown, in accordance with some embodiments, an exemplary decision tree algorithm flow chart for classification and analysis of a large burst in a pipe network.
Figure 6B:
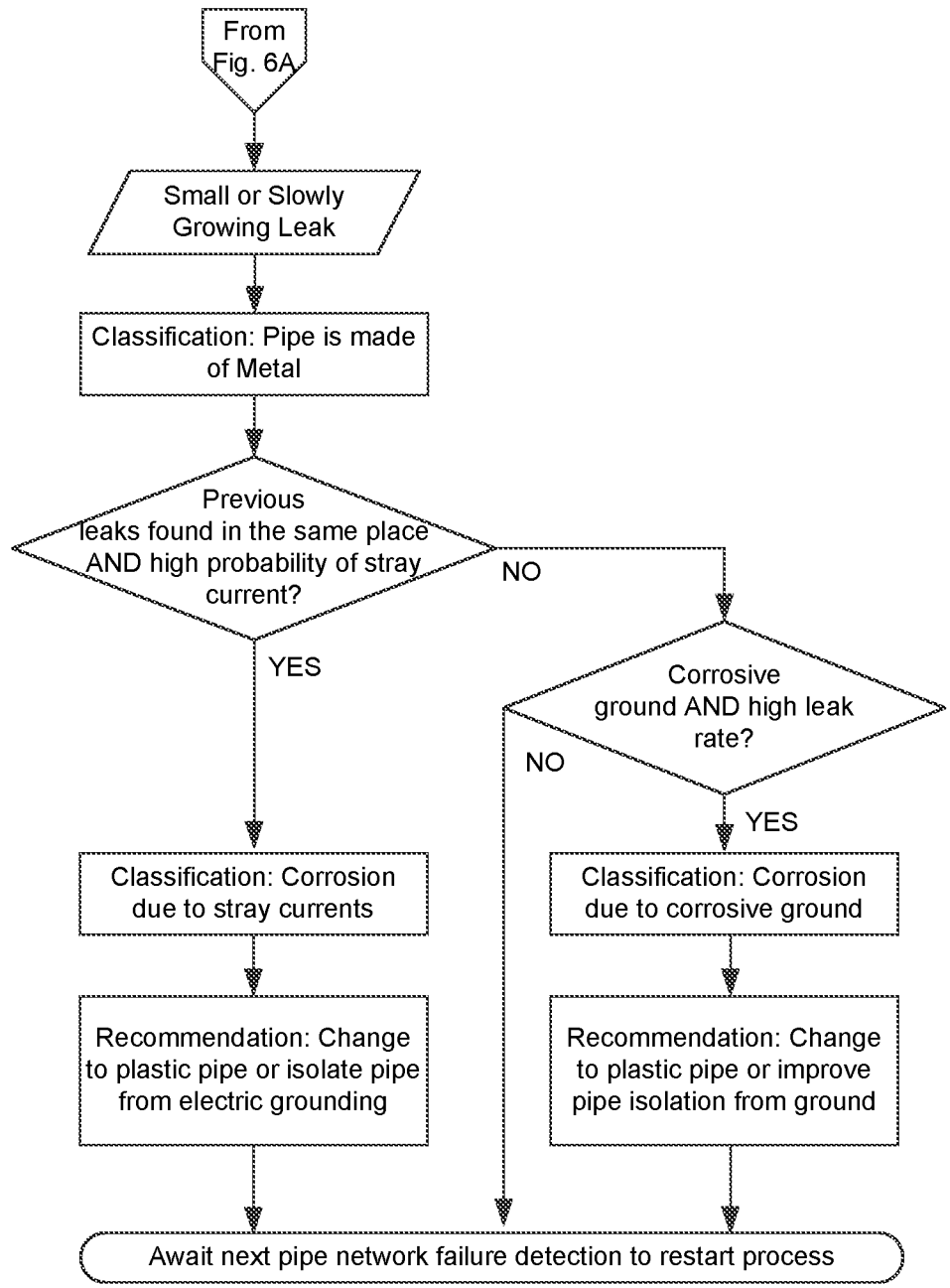
In FIG. 6B, there is shown, in accordance with some embodiments, an exemplary decision tree algorithm flow chart for classification and analysis of a slowly growing leak in a pipe network; and In FIG. 6C, there is shown, in accordance with some embodiments, an exemplary decision tree algorithm flow chart for classification and analysis of a fast growing leak in a pipe network.
Figure 6C:
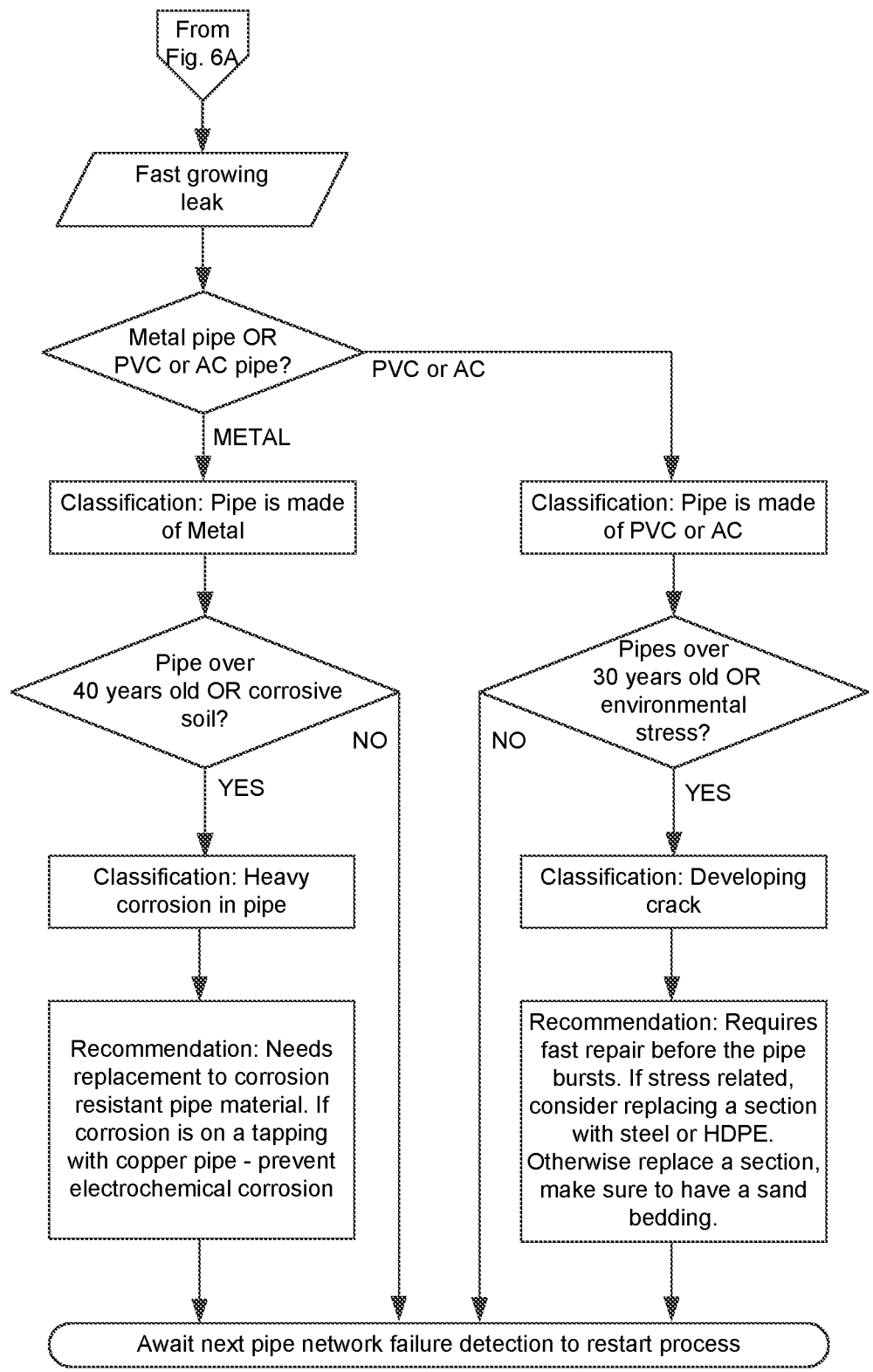

FIGS. 6A, 6B and 6C, are exemplary decision tree algorithm flow charts, in accordance with some embodiments of the present invention. The flow charts may collectively form a pipe network failure classification and repair recommendation technique/method, implementable by a system in accordance with some embodiments of the present invention. Each of the flow charts constitutes a decision tree algorithm for analyzing/handling leaks (failures) having different intensity characteristics: FIG. 6A—a large burst; FIG. 6B—a slowly growing leak; and FIG. 6C—a fast growing leak. Leak intensity, or intensity change rates, may for example be calculated/estimated based on flow meters readings and/or acoustic/vibration sensors collected data, as described herein.

In FIG. 6A, there is shown, in accordance with some embodiments, an exemplary decision tree algorithm flow chart for classification of a pipe network leak failure, associated with a large burst in a pipe. The threshold values and conditions, selected for and described in the figure, are optional examples and are not, in any way, to limit the scope of the related teachings.

In the figure, there is shown an initial stage of classification/characterization of a detected pipe network failure—based on leak intensity and intensity change rates—as resulting from or being related to either: a large pipe burst, a slowly growing leak; or a fast growing leak.

The failure of FIG. 6A, classified as 'large pipe burst' related, is then analyzed as follows.

Determining whether the failure is linked to pressure transient or pressure induced stress, for example, based on pressure sensors collected data.

If linked to pressure transient or pressure induced stress, determining whether the failed pipe diameter is greater than 6 inches OR the pipe is made of PVC or AC, for example, by referencing the pipe network parts database records of the failed pipe.

If pipe diameter is greater than 6 inches OR the pipe is made of PVC or AC, then classifying the failure as Pressure induced and recommending to optimize the network to reduce pressure surges.

If the failure is not linked to pressure transient or pressure induced stress, or if the failed pipe diameter is not greater than 6 inches AND the pipe is not made of PVC or AC, classifying the failure as Not associated with pressure.

If failure not associated with pressure, and pipe is made of PVC or AC AND over 40 years old, classifying the failure as Burst due to pipe material degradation and, recommending to replace the pipe or to change to HDPE pipes if degradation is related to the ground.

If failure not associated with pressure, and significant ground temperature change (e.g. frost) was/is experienced in pipe environment, classifying the failure as Burst due to ground movement or frost and, recommending to change pipe to new steel pipe or to install the pipe deeper in the ground if frost related.

Once a failure classification and a matching recommendation(s) have been made, or if no classification has been established, the system/algorithm may wait for the next failure detection to repeat the algorithm flow.

In FIG. 6B, there is shown, in accordance with some embodiments, an exemplary decision tree algorithm flow chart for classification of a pipe network leak failure, associated with a slowly growing leak in a pipe. The threshold values and conditions, selected for and described in the figure, are optional examples and are not, in any way, to limit the scope of the related teachings.

The failure of FIG. 6B, classified as 'small or slowly growing leak' related, is then analyzed as follows.

Classifying the failure as a Metal made pipe failure, based on the slowly growing leak intensity initial characterization.

If previous leaks were found in the same location, or section, of the pipe network AND there is a high probability of a stray electric current, classifying the failure as Pipe corrosion due to stray currents related and recommending to change from metal to plastic pipe or to isolate the pipe from electric grounding.

If previous leaks were not found in the same location, or section, of the pipe network AND/OR there is a low probability of a stray electric current then, if the ground is corrosive AND the leak has a high rate (has already grown) classifying the failure as Corrosion due to corrosive ground and recommending to change to plastic pipe or improve pipe isolation from ground.

Once a failure classification and a matching recommendation(s) have been made, or if no classification has been established, the system/algorithm may wait for the next failure detection to repeat the algorithm flow.

In FIG. 6C, there is shown, in accordance with some embodiments, an exemplary decision tree algorithm flow chart for classification of a pipe network leak failure, associated with a fast growing leak in a pipe. The threshold values and conditions, selected for and described in the figure, are optional examples and are not, in any way, to limit the scope of the related teachings.

The failure of FIG. 6C, classified as 'fast growing leak' related, is then analyzed as follows.

Determining whether the pipe is made of metal OR of PVC or AC, if the pipe is made of metal classifying the failure as related to such.

If the pipe is over 40 years old OR the soil is corrosive, classifying the failure as Heavy corrosion in pipe related.

If the pipe is made of PVC or AC classifying the failure as related to such and, if the pipe is over 30 years old OR environmental physical stress was applied to it, classifying the failure as a Developing crack and recommending fast repair before the pipe bursts—if stress related, replacing a section with steel or HDPE, otherwise, replace a section.

Once a failure classification and a matching recommendation(s) have been made, or if no classification has been established, the system/algorithm may wait for the next failure detection to repeat the algorithm flow.

The following is an exemplary method/technique, for implementation by a system algorithm(s), for the automatic classification of failures and for 'failure classes' based repair-recommendation and failure-prediction. According to some embodiments, a machine learning model implementation may classify system detected failures using pipe network features input parameters/values.

According to some embodiments, a supervised learning approach may be used to train the model, wherein sets of pipe network features parameters/values, of failure examples correctly classified by human experts/curators or by another classification method/technique (e.g. a decision tree), are used as the model's training data.

According to some embodiments, the type of feedback, or lack of such, received following to a classification made by the machine learning model, may be used to tune the neural network cells of the model. For example, a pipe network failure/leak classification decision made by the model may be examined within the following time period. Further failure/leak detections related to the same network pipe(s)/part(s) within a given following time period may be indicative of an initial classification decision by the model, that did not help solve the failure/leak (i.e. repair recommendations generated/selected based on the model made classification did not solve failure or prevent its reassurance)—accordingly, the level of correctness of the model's initial decision may be tuned down. Lack of failure/leak detections related to the same network pipe(s)/part(s) within a given following time period, on the hand, may be indicative of an initial classification decision by the model, that did help solve the failure/leak—accordingly, the level of correctness of the model's initial decision may be tuned down.

Once the model is trained the system may automatically classify the pipe network failures according to predefined, and/or optionally machine defined, classes. The machine learning model's classification algorithm may be one of, or may include a combination of, the following algorithms: Linear Regression; Logistic Regression; K-Nearest Neighbors; and/or any other algorithm, know today or to be devised in the future, for classification problems.

Condition Assessment

According to some embodiments of the present invention, the conditions of a pipe network may be assessed based on pipe network features input parameters/values and/or on failure/leak classification(s) based thereof.

According to some embodiments, an exemplary 'Local' pipe condition assessment scheme/method/technique may—once a failure is identified—include: (1) evaluating and classifying the 'local' failure's type for that specific pipe failure; (2) providing a recommendation for repair that is based on the classification of the specific 'local' failure; (3) assessing the condition of the whole, or a larger part, of the pipe network at least partially based on the specific 'local' failure classification and recommendation; and/or (4) recommending a failure prevention practice that defines the optimal maintenance strategy based on the specific 'local' failure event.

According to some embodiments, an exemplary 'General' approach pipe condition assessment scheme/method/technique may include: (1) estimating the pipe condition of various different sections of the pipe network using collected failure rate records (i.e. from history); and/or (2) classifying each, or a subset, of the pipe segments in the network, based on pipe network features input parameters/values, such as parts/pipes metadata and sensor data. According to some embodiments, only a subset of the pipe segments in the network, having higher rates of failure history, may be selected for classification.

For example, a cast iron pipe, of years 1950-1960, 8" (inch) in diameter, in corrosive soil, has the following leak statistics and growing rate (growth rate may be estimated by acoustic sensors and/or district water meters):

(a) Year 2000, 0.4 leaks per km a year, growth rate 20% a year;
(b) Year 2010, 0.6 leaks per km a year, growth rate 40% a year; and
(c) Year 2018, 1 leaks per km a year, growth rate 200% a year.

In the example, we see that in 2018 the leak rate is 1 leaks per km, which may still be considered bearable, the leak growth rate, however, is very high. This may indicate that if the leak is not detected and repaired within a short period of time, it can cause damage such as building flooding or road damage. Pipe condition of the pipe(s) having high leak growth rate may be accordingly defined as important/critical and their prioritized repair/replacement, as well as repair/replacement of other areas that have high sensitivity to pipe failure, is advanced. The described example may be implemented using continuous sensor monitoring (as described herein) providing pipe network data and condition assessment.

According to some embodiments, an exemplary method/technique for pipe network condition assessment may include: (1) defining the classes of pipe failures that are relevant to providing operational/maintenance solution/remediation and/or to indicating critical condition; (2) classifying an examined pipe section(s), using pipe features including at least sensor data derived features; (3) calculating the failure rate and severity for each cluster of pipe sections in the pipe network; and/or (4) calculating the overall pipe condition and maintenance strategy for each cluster independently based on best practice.

According to some embodiments, exemplary best practices for preventing a pipe failure, may include: (1) For pressure transient related burst—prevent pipe destructive pressure transients by installing equipment for reducing pressure transients in the network, this may include a combination of: pump smooth start, air valves, dampers, etc.; (2) For stray current corrosion—isolate the pipe from electric currents and reduce current sources and/or replace pipe section to plastic pipes; (3) For a heavily corroded section—in case that the corrosion is related to aggressive ground, replace the pipe section to plastic pipe; and/or (4) For ground movement or vibration caused failure—replace to steel pipe and/or use concrete cover.

According to some embodiments of the present invention, a system for pipe network failure classification may comprise: a network part sensor layer, including one or more network part sensors deployed in, on or in proximity to a pipe(s) of the pipe network, for monitoring pipe(s) operation condition and collecting related parameter values; a pipe network parts database including feature parameter value records of pipes in the pipe network; and a classification processing logic, communicatively networked to the network part sensor layer and the pipe network parts database, and adapted to intermittently receive sensor collected parameters from the network part sensor layers, wherein upon receipt of an indication of a pipe failure in the pipe network, the classification processing logic is adapted to reference records of the pipe network parts database and to retrieve one or more feature parameter values associated with the failed pipe's operational or environmental conditions and, to classify the pipe failure into one of two or more failure categories associated with different failure causes, wherein values of parameters of the failed pipe from both, the part sensor layer and the pipe network parts database are factored as part of the classification decisions.

According to some embodiments, the system may further comprise a history of failures database, wherein the classification processing logic is further adapted to reference records of the history of failures database and to retrieve one or more prior failure parameter values associated with the failed pipe, and to factor the retrieved values as part the classification decisions.

According to some embodiments, the system may further comprise a detection processing logic, wherein the network part sensor layer includes one or more acoustic sensors, and wherein the detection processing logic is adapted to detect a leak and estimate the intensity and intensity growth rate of the leak, based on acoustic sensor collected parameter values.

According to some embodiments, the system may further comprise a correlation processing logic, wherein the network part sensor layer includes one or more pressure sensors, and wherein the correlation processing logic is adapted to detect and correlate pressure changes and pressure surges with pipe failure appearance rate and growth rate.

According to some embodiments, the system may further comprise a condition assessment processing logic, wherein the network part sensor layer includes one or more pressure sensors and, wherein the condition assessment processing logic is adapted to estimate the condition of multiple pipe network sections, based on the calculation of a pressure stress exerted on each of the pipe sections using corresponding parameter values collected by said pressure sensors.

According to some embodiments, the pressure sensors may be further adapted to collect pressure transient related parameter values, including at least pressure transient magnitudes and number of oscillations over a time period, and wherein the condition assessment processing logic is adapted to calculate the probability of a pressure transient related failure in the pipe network or a specific section thereof, using a pipe stress factor calculation scheme factoring at least the pressure magnitude values and the pressure oscillation number values in the pressure transient, as collected by the pressure sensors.

According to some embodiments, the system may further comprise a remediation processing logic for selecting for recommendation one or more pipe network failure remediation solutions or tasks matching the failure category into which the pipe network failure was classified.

According to some embodiments, the system may further comprise a condition assessment processing logic, communicatively networked to the classification processing logic, wherein upon receipt of request for an assessment of a specific pipe network section(s), the condition assessment processing logic is adapted to reference classification results records of one or more failure classifications made by the classification processing logic and to retrieve one or more parameter values associated with the classification of pipe network section(s) listed in the assessment request, and to assess the condition of the pipe network section(s) in the request, wherein values of parameters associated with former classification of pipe network section(s) in the request are factored as part of the condition assessment decisions.

According to some embodiments, the system may further comprise a maintenance processing logic for selecting for recommendation one or more pipe network maintenance tasks matching the condition assessment decisions and associated therewith.

According to some embodiments, the maintenance processing logic may be further adapted for selecting for recommendation one or more pipe network failure repair tasks matching the classification decisions and associated therewith.

According to some embodiments of the present invention, a method for pipe network failure classification may comprise: monitoring the operation conditions of a pipe network's pipe(s) and logging operation related parameter values collected by one or more sensors deployed in, on or in proximity to a pipe(s) of the pipe network; monitoring the environment conditions of a pipe network's pipe(s) and collecting related parameter values; intermittently receiving network part and network part environment parameter values; receiving an indication of a pipe failure in the pipe network or learning of a pipe failure in the pipe network by accessing a pipe network failures related database, including records of operation related parameter values collected by the one or more sensors, and finding an indication of a pipe failure therein; referencing records of a pipe network parts database including feature parameter value records of pipes in the pipe network; retrieving one or more feature parameter values associated with the failed pipe; and classifying the pipe failure into one of two or more failure categories associated with different failure causes, while factoring, as part of classification decisions, at least: one collected value of operation parameters of the failed pipe, one collected value of environment parameters of the failed pipe and one retrieved value from the pipe network parts database records.

According to some embodiments, the method may further comprise: referencing records of a history of failures database including failure parameter value records of prior failure pipes in the pipe network; retrieving one or more failure parameter values associated with the failed pipe; and further factoring, as part of classifying the pipe failure, at least one value of past failure parameters of the failed pipe, retrieved from the history of failures database.

According to some embodiments, the method may further comprise: as part of monitoring the operation conditions of a pipe network's pipe(s), monitoring the acoustic conditions of the pipe network's pipe(s) and collecting related parameter values; and detecting a pipe leak in the pipe network and estimating the intensity and intensity growth rate of the leak, based on the collected acoustic operational parameter values.

According to some embodiments, the method may further comprise: monitoring the pressure conditions of a pipe network's pipe(s) and collecting related parameter values; and correlating, pressure changes and pressure surges as expressed in pressure condition parameter values collected over time, with known pipe failure appearance and growth rate schemes.

According to some embodiments, the method may further comprise: calculating a pressure stress exerted on pipe(s) for multiple pipe sections, using corresponding parameter values collected by said pressure sensors; and estimating, at least partially based on the calculated stress, the pipe condition of at least some of the multiple pipe network sections.

According to some embodiments, the method may further comprise: collecting pressure transient related parameter values, including at least pressure transient magnitudes and number of oscillations over a time period; and calculating the probability of a pressure transient related failure in the pipe network or a specific section thereof, using a pipe stress factor calculation scheme factoring at least the pressure magnitude values and the pressure oscillation number values in the pressure transient.

According to some embodiments, the method may further comprise selecting for recommendation one or more pipe network failure remediation solutions or tasks matching the failure category into which the pipe network failure was classified.

Functions, operations, components and/or features described herein with reference to one or more embodiments, may be combined or otherwise utilized with one or more other functions, operations, components and/or features described herein with reference to one or more other embodiments, or vice versa. While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A system for pipe network failure classification, said system comprising:
   one or more sensors deployed in, on or in proximity to at least one pipe of a pipe network, for monitoring a pipe operation condition and collecting related parameter values; and,
   at least one processor, communicatively networked to said one or more sensors and to a pipe network parts database, said pipe network parts database storing feature parameter value records of pipes in the pipe network, said processor is configured to:
   (i) intermittently receive sensor collected parameters from said one or more sensors;
   (ii) reference, upon receipt of an indication of a failure of a pipe in the pipe network, records of said pipe network parts database;
   (iii) retrieve one or more feature parameter values associated with the failed pipe's operational or environmental conditions; and
   (iv) classify the pipe failure into one of two or more failure categories associated with different failure causes, based on values of parameters associated with the failed pipe that are received from at least one of said one or more sensors or said pipe network parts database.

2. The system according to claim 1, further comprising a failure history database storing a history of failures,
   wherein said at least one processor is further configured to reference records of said history of failures and to retrieve one or more prior failure parameter values associated with the failed pipe, and
   classify the pipe failure into one of two or more failure categories associated with different failure causes based on the retrieved one or more prior failure parameter values.

3. The system according to claim 1,
   wherein said one or more sensors include one or more acoustic sensors, and
   wherein said at least one processor is configured to detect a leak and estimate an intensity and an intensity growth rate of the leak, based on parameter values collected by the one or more acoustic sensors.

4. The system according to claim 3,
   wherein said one or more sensors include one or more pressure sensors, and wherein said at least one processor is configured to detect and correlate pressure changes and pressure surges with a pipe failure appearance rate and a growth rate.

5. The system according to claim 1,
wherein said one or more sensors include one or more pressure sensors, and
wherein said at least one processor is configured to estimate a condition of multiple pipe network sections, based on calculation of a pressure stress exerted on each of the pipe network sections using corresponding parameter values collected by said one or more pressure sensors.

6. The system according to claim 5,
wherein said one or more pressure sensors are further configured to collect pressure transient related parameter values that include at least pressure transient magnitudes and a number of oscillations over a time period, and
wherein said at least one processor is configured to calculate a probability of a pressure transient related failure in the pipe network or a specific section thereof, using a pipe stress factor calculation scheme factoring at least pressure magnitude values and pressure oscillation number values in the pressure transient related failure, as collected by said one or more pressure sensors.

7. The system according to claim 1, wherein said at least one processor is configured to select for recommendation one or more pipe network failure remediation solutions or tasks matching a failure category into which a pipe network failure is classified.

8. The system according to claim 1, wherein said at least one processor is further configured to:
upon receipt of request for an assessment of a specific pipe network section, reference classification results records of one or more failure classifications made by said at least one processor and retrieve one or more parameter values associated with a classification of at least one pipe network section listed in the assessment request, and
assess a condition of the at least one pipe network section listed in the assessment request, based on values of parameters associated with a former classification of the at least one pipe network section listed in the assessment request.

9. The system according to claim 8, wherein said at least one processor is configured to select for recommendation one or more pipe network maintenance tasks matching the condition assessment and associated therewith.

10. The system according to claim 1, wherein said at least one processor is configured to select for recommendation one or more pipe network failure repair tasks matching a result of the classification and associated therewith.

11. The system according to claim 2, wherein the records of said history of failures include a database of prior leak parameter records, the database of prior leak parameter records comprising at least one of (1) location of leak on a pipe network; (2) leaking pipe section details; (3) growth rate of leak over time; (4) leak size at the time of repair; (5) leak type selected from crack, hole, or corrosion; or (6) other leak related data.

12. The system according to claim 5, wherein the pressure stress exerted on each of the pipe network sections is calculated by the following formula:

$$\text{Stress} = (P \times D)/(2 \times T),$$

wherein P=Pressure, D=Pipe Diameter and T=Pipe Wall Thickness,
wherein pressure changes or pressure change patterns, causing a stress defined as above predefined or dynamically defined based on thresholds or limits causes a pipe network failure.

13. The system according to claim 1, wherein
said at least one processor is configured to execute at least one logic of a failure classification logic, a pipe condition assessment logic or a remediation/maintenance recommendation logic, and
the at least one logic is configured to execute respective algorithms using as factors (1) any combination of pipe network features and factors based on sensor collected data and pipe network pre-collected/stored data, and (2) parameters or input values for the execution of the algorithms, potentially affecting resulting algorithm outcomes/outputs, and failure classification, assessment or recommendation decisions that are based on algorithms' outcomes/outputs.

14. The system according to claim 1, wherein the feature parameter value records of pipes comprise at least one of
(1) pipe material: (a) metal: cast iron, ductile iron, steel, steel with cement coating, (b) plastic: polyvinyl chloride (PVC) or unplasticized polyvinyl chloride (UPVC), high-density polyethylene (HDPE) or medium-density polyethylene (HDPE), (c) asbestos-concrete (AC), (d) concrete;
(2) pipe diameter;
(3) depth of pipe installation;
(4) pipe age; or
(5) specific information of pipe or installation comprising at least one of weakness in joints, sensitivity to corrosion.

15. The system according to claim 1, wherein the environmental conditions at proximity or surroundings of a pipe network and their changing over time, is used for at least one of (1) pipe network failure classification, (2) pipe condition assessment, (3) part of the system's decision processes as supportive information to strengthen, reaffirm, weaken, or contradict, or (4) classification and recommendation decisions based on measured or stored data and features.

16. The system according to claim 1, wherein
the one or more sensors comprise one or more environmental sensors, optionally positioned at multiple locations in proximity surroundings of the pipe network, and
readings from the one or more environmental sensors are considered or factored as (1) part of pipe network failure detection, (2) failure classification, (3) network condition assessment or recommendation for failure, condition remediation, or maintenance.

17. The system according to claim 1, wherein
the feature parameter values associated with the environmental conditions comprise environmental parameters of a pipe network's proximity or surroundings, to be considered as part of the system's failure analysis decisions, and
the environmental parameters of a pipe network's proximity or surroundings comprises a combination of: (1) temperature, temperature change from frost to warm, or temperature change from warm to frost; (2) soil acidity; (3) ground movements and vibration due to traffic or constructions works; (4) stray currents in the ground from electrical grounding; or (5) ground type comprising at least one of sand, clay or rocky.

18. The system according to claim 1, wherein said pipe network parts database stores: (1) historic records of leaks labeled by failure type including corrosion, ground movement, or leak location; (2) attributes of a pipe section including at least one of material, diameter, year of installation, working pressure, pressure transients, temperature changes, wall thickness, ground corrosiveness, ground conductivity, or copper pipe connection density per unit length.

19. A method for pipe network failure classification, said method comprising:
monitoring operation conditions of at least one pipe of a pipe network and logging operation related parameter values collected by one or more sensors deployed in, on or in proximity to the at least one pipe of the pipe network;
monitoring environment conditions of the at least one pipe of the pipe network and collecting related parameter values;
intermittently receiving network part environment parameter values;
receiving an indication of a pipe failure in the pipe network or learning of a pipe failure in the pipe network by accessing a pipe network failures database that stores records of operation related parameter values collected by the one or more sensors, and finding an indication of a pipe failure therein;
referencing records of a pipe network parts database that stores feature parameter value records of pipes in the pipe network;
retrieving one or more feature parameter values associated with a failed pipe; and
classifying the pipe failure into one of two or more failure categories associated with different failure causes, based on at least one collected value of operation parameters of the failed pipe, one collected value of environment parameters of the failed pipe and one retrieved value from the feature parameter value records of the pipe network parts database.

20. The method according to claim 19, further comprising:
referencing records of a failure history database that stores failure parameter value records of prior failure pipes in the pipe network; and
retrieving one or more failure parameter values associated with the failed pipe,
wherein classifying the pipe failure includes classifying the pipe failure based on at least one value of past failure parameters of the failed pipe, retrieved from the failure history database.

21. The method according to claim 19,
wherein monitoring operation conditions of the at least one pipe of the pipe network includes monitoring acoustic conditions of the at least one pipe of the pipe network and collecting acoustic operational parameter values, and
wherein the method further comprises detecting a pipe leak in the pipe network and estimating an intensity and an intensity growth rate of the leak, based on the collected acoustic operational parameter values.

22. The method according to claim 21, further comprising:
monitoring pressure conditions of the at least one pipe of the pipe network and collecting related parameter values; and
correlating, pressure changes and pressure surges as expressed in pressure condition parameter values collected over time, with known pipe failure appearances and growth rate schemes.

23. The method according to claim 19, further comprising:
calculating a pressure stress exerted on at least one pipe for multiple pipe network sections, using corresponding parameter values collected by one or more pressure sensors; and
estimating a pipe condition of at least one of the multiple pipe network sections at least partially based on the calculated stress.

24. The method according to claim 23, further comprising:
collecting pressure transient related parameter values that include at least pressure transient magnitudes and a number of oscillations over a time period; and
calculating a probability of a pressure transient related failure in the pipe network or a specific section thereof, using a pipe stress factor calculation scheme factoring at least pressure magnitude values and pressure oscillation number values in the pressure transient related failure.

25. The method according to claim 19, further comprising:
selecting for recommendation one or more pipe network failure remediation solutions or tasks matching a failure category into which a pipe network failure is classified.

26. The method according to claim 19, further comprising:
upon receipt of request for an assessment of a specific pipe network section, referencing classification results records of one or more failure classifications and retrieving one or more parameter values associated with a classification of at least one pipe network section listed in the assessment request, and
assessing a condition of the at least one pipe network section listed in the assessment request, based on values of parameters associated with a former classification of the at least one pipe network section listed in the assessment request.

27. The method according to claim 26, further comprising:
selecting for recommendation one or more pipe network maintenance tasks matching the condition assessment and associated therewith.

28. The method according to claim 19, further comprising:
selecting for recommendation one or more pipe network failure repair tasks matching a result of the classification and associated therewith.

29. The method according to claim 20, wherein the records of said history of failures include a database of prior leak parameter records, the database of prior leak parameter records comprising at least one of (1) location of leak on a pipe network; (2) leaking pipe section details; (3) growth rate of leak over time; (4) leak size at the time of repair; (5) leak type selected from crack, hole, or corrosion; or (6) other leak related data.

30. The method according to claim 23, wherein the pressure stress exerted on each of the pipe network sections is calculated by the following formula:

$$\text{Stress} = (P \times D)/(2 \times T),$$

wherein P=Pressure, D=Pipe Diameter and T=Pipe Wall Thickness, wherein pressure changes or pressure change patterns, causing a stress defined as above predefined or dynamically defined based on thresholds or limits causes a pipe network failure.

31. The method according to claim 19, wherein
said at least one processor is configured to execute at least one logic of a failure classification logic, a pipe condition assessment logic or a remediation/maintenance recommendation logic, and
the at least one logic is configured to execute respective algorithms using as factors (1) any combination of pipe network features and factors based on sensor collected data and pipe network pre-collected/stored data, and (2) parameters or input values for the execution of the algorithms, potentially affecting resulting algorithm outcomes/outputs, and failure classification, assessment or recommendation decisions that are based on algorithms' outcomes/outputs.

32. The method according to claim 19, wherein the feature parameter value records of pipes comprise at least one of
(1) pipe material: (a) metal: cast iron, ductile iron, steel, steel with cement coating, (b) plastic: polyvinyl chloride (PVC) or unplasticized polyvinyl chloride (UPVC), high-density polyethylene (HDPE) or medium-density polyethylene (HDPE), (c) asbestos-concrete (AC), (d) concrete;
(2) pipe diameter;
(3) depth of pipe installation;
(4) pipe age; or
(5) specific information of pipe or installation comprising at least one of weakness in joints, sensitivity to corrosion.

33. The method according to claim 19, wherein the environmental conditions at proximity or surroundings of a pipe network and their changing over time, is used for at least one of (1) pipe network failure classification, (2) pipe condition assessment, (3) part of the system's decision processes as supportive information to strengthen, reaffirm, weaken, or contradict, or (4) classification and recommendation decisions based on measured or stored data and features.

34. The method according to claim 19, wherein
the one or more sensors comprise one or more environmental sensors, optionally positioned at multiple locations in proximity surroundings of the pipe network, and
readings from the one or more environmental sensors are considered or factored as (1) part of pipe network failure detection, (2) failure classification, (3) network condition assessment or recommendation for failure, condition remediation, or maintenance.

35. The method according to claim 19, wherein
the feature parameter values associated with the environmental conditions comprise environmental parameters of a pipe network's proximity or surroundings, to be considered as part of the system's failure analysis decisions, and
the environmental parameters of a pipe network's proximity or surroundings comprises a combination of: (1) temperature, temperature change from frost to warm, or temperature change from warm to frost; (2) soil acidity; (3) ground movements and vibration due to traffic or constructions works; (4) stray currents in the ground from electrical grounding; or (5) ground type comprising at least one of sand, clay or rocky.

36. The method according to claim 19, wherein said pipe network parts database stores: (1) historic records of leaks labeled by failure type including corrosion, ground movement, or leak location; (2) attributes of a pipe section including at least one of material, diameter, year of installation, working pressure, pressure transients, temperature changes, wall thickness, ground corrosiveness, ground conductivity, or copper pipe connection density per unit length.

* * * * *